(12) United States Patent
King et al.

(10) Patent No.: US 11,694,212 B2
(45) Date of Patent: Jul. 4, 2023

(54) DECENTRALIZED GOVERNANCE REGULATORY COMPLIANCE (D-GRC) CONTROLLER

(71) Applicant: iUNU, Inc., Seattle, WA (US)

(72) Inventors: Matthew Charles King, Seattle, WA (US); Ethan Victor Takla, Seattle, WA (US); Adam Phillip Takla Greenberg, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 406 days.

(21) Appl. No.: 16/830,073

(22) Filed: Mar. 25, 2020

(65) Prior Publication Data

US 2021/0304216 A1    Sep. 30, 2021

(51) Int. Cl.
   *G06Q 30/00*     (2012.01)
   *G06Q 30/018*    (2023.01)
   (Continued)

(52) U.S. Cl.
   CPC ....... *G06Q 30/018* (2013.01); *G06F 16/2379* (2019.01); *G06F 16/27* (2019.01);
   (Continued)

(58) Field of Classification Search
   CPC ..... G06F 16/2379; G06F 16/27; G06N 20/00; G06Q 50/02; H04L 9/3239; H04L 9/50
   See application file for complete search history.

(56) References Cited

U.S. PATENT DOCUMENTS 8,489,437 B1   7/2013   Dlott et al.
9,202,252 B1   12/2015  Smith et al.
(Continued)

FOREIGN PATENT DOCUMENTS

CN    108182482 A    6/2018
CN    109191003 A    1/2019
(Continued)

OTHER PUBLICATIONS

U.S. Appl. No. 16/428,911, Notice of Allowance dated Oct. 8, 2021, 19 pages.
Ohkubo, Miyako et al. "Cryptographic Approach to 'Privacy-Friendly' Tags." RFID Privacy Workshop. Cambridge, MA. Nov. 15, 2003, 9 pages.
(Continued)

*Primary Examiner* — Philip J Chea
*Assistant Examiner* — Sangseok Park
(74) *Attorney, Agent, or Firm* — Han Santos, PLLC

(57) ABSTRACT

The present disclosure describes techniques for dynamically monitoring and collating data associated with an agricultural operation for the purpose of demonstrating compliance with an agricultural compliance plan (ACP). More specifically, a decentralized governance compliance (D-GRC) controller is described that is configured to generate a distributed ledger that dynamically processes compliance of individual actions associated with an ACP. The distributed ledger may be configured to track regulatory compliance associated with a cycle of agricultural activities associated with an agricultural product. Agricultural activities may include an inventory inspection of agricultural products, a facility inspection of a facility used for an agricultural operation, or vehicle inspection of vehicles used to transport agricultural products. Further, the distributed ledger may be configured to automate the governance of an ACP across various entities such that are each compliant or non-compliant response from an entity, automatically triggers an update to the ACP.

18 Claims, 15 Drawing Sheets

(51) Int. Cl.

| | |
|---|---|
| *G06Q 50/02* | (2012.01) |
| *G06Q 50/26* | (2012.01) |
| *G06Q 10/10* | (2023.01) |
| *G06Q 10/0631* | (2023.01) |
| *G06Q 50/28* | (2012.01) |
| *G06K 19/06* | (2006.01) |
| *G06F 16/23* | (2019.01) |
| *H04L 9/40* | (2022.01) |
| *G06N 20/00* | (2019.01) |
| *G06N 5/04* | (2023.01) |
| *G06K 19/07* | (2006.01) |
| *G06F 16/27* | (2019.01) |
| *H04L 9/32* | (2006.01) |

(52) U.S. Cl.
CPC .......... *G06K 19/06037* (2013.01); *G06K 19/0723* (2013.01); *G06N 5/04* (2013.01); *G06N 20/00* (2019.01); *G06Q 10/06316* (2013.01); *G06Q 10/10* (2013.01); *G06Q 50/02* (2013.01); *G06Q 50/265* (2013.01); *G06Q 50/28* (2013.01); *H04L 9/3239* (2013.01); *H04L 63/102* (2013.01)

(56) References Cited

U.S. PATENT DOCUMENTS

| | | | |
|---|---|---|---|
| 9,582,778 | B2 | 2/2017 | Dlott et al. |
| 10,491,608 | B1* | 11/2019 | Tatge ................. G06Q 10/0835 |
| 11,321,652 | B1* | 5/2022 | Mahmood ............. G06N 20/00 |
| 2003/0182260 | A1 | 9/2003 | Pickett et al. |
| 2005/0228688 | A1 | 10/2005 | Visser et al. |
| 2012/0310700 | A1 | 12/2012 | Kurtz et al. |
| 2013/0185104 | A1 | 7/2013 | Klavins |
| 2018/0285810 | A1* | 10/2018 | Ramachandran .... G06Q 10/087 |
| 2018/0294957 | A1* | 10/2018 | O'Brien ................ H04L 9/0643 |
| 2018/0322426 | A1 | 11/2018 | Schmaltzx et al. |
| 2019/0065593 | A1 | 2/2019 | Barski |
| 2019/0090432 | A1 | 3/2019 | Duquette et al. |
| 2019/0195852 | A1* | 6/2019 | Bryant, Jr. ......... G01N 33/0098 |
| 2020/0027096 | A1 | 1/2020 | Cooner |
| 2020/0053957 | A1 | 2/2020 | Rabby et al. |
| 2020/0226741 | A1* | 7/2020 | Correia Villa Real ... G06T 7/62 |
| 2020/0311299 | A1* | 10/2020 | Amar .................. G06F 21/6245 |
| 2021/0014158 | A1* | 1/2021 | Zhang ................. H04L 47/2425 |
| 2021/0233019 | A1* | 7/2021 | Freeman ............ G06Q 10/0833 |
| 2022/0122026 | A1* | 4/2022 | Okabe .................... G06Q 40/04 |

FOREIGN PATENT DOCUMENTS

| | | | |
|---|---|---|---|
| CN | 110880118 | A * | 3/2020 |
| KR | 101936317 | B1 | 4/2019 |
| WO | 2011115983 | A1 | 9/2011 |

OTHER PUBLICATIONS

International Patent Application No. PCT/US2021/023304, Search Report dated Jul. 12, 2021, 4 pages.

International Patent Application No. PCT/US2021/023304, Written Opinion dated Jul. 12, 2021, 5 pages.

U.S. Appl. No. 16/428,911, Notice of Allowance dated Jun. 30, 2021, 26 pages.

Figureau et al. "Policy instruments for decentralized management of agricultural groundwater abstraction: a participatory evaluation." In: Ecological Economics. Feb. 11, 2016(Feb. 11, 2016) Retrieved on Jul. 23, 2020 (Jul. 23, 2020) from entire document.

International Patent Application No. PCT/US2020/035419, Search Report dated Aug. 7, 2020, 10 pages.

Canadian Patent Application No. 3,138,993 Office Action dated Jan. 11, 2023, 5 pages.

* cited by examiner

| SCHEDULE | DESCRIPTION | INTERACTING ENTITIES | DEPENDENCIES | DATA INTEGRATION | COMPLIANCE STATUS |
|---|---|---|---|---|---|
| | | AGRICULTURAL COMPLIANCE PLAN 104 | | | |
| 1 | SEED MANAGEMENT | SUPPLIER(C) WAREHOUSE(P) ⋮ AUDITOR(C) | - | YES | YES |
| 2 | PLANT GROWTH | GROWER(C) SUPPLIER(P) ⋮ AUDITOR(C) | SCHEDULE 2 | ACTIVE | ACTIVE |
| 3 | PLANT HARVEST | GROWER(C) ⋮ AUDITOR (C) | SCHEDULE 3 | | PENDING |
| ⋮ | ⋮ | ⋮ | ⋮ | ⋮ | ⋮ |
| N | SHIPMENT | GROWER (P) SHIPMENT CO (C) ⋮ AUDITOR (C) | SCHEDULE 3, N-1 | | PENDING |

FIG. 5A

| SCHEDULE: SEED MANAGEMENT 502 | | | | |
|---|---|---|---|---|
| TASK | ENTITIES | DESCRIPTION | DEPENDENCY | COMPLIANCE STATUS |
| 1 | GROWER (C) | VISUAL INVENTORY INSPECTION | - | YES |
| 2 | GROWER (C) SUPPLIER (P) | CAPTURE INVENTORY CODE | 1 | ACTIVE |
| 3 | GROWER (C) | MONITOR WATER CONDITIONS (I.E. STORAGE, TREATMENT, LISTERIA SWAB ETC.) | 2 | PENDING |
| 4 | AUDITOR (C) | AGRICULTURAL SAFETY AUDIT LETTER OF GUARANTEE | - | ACTIVE |
| ... | ... | ... | ... | ... |
| N | GROWER (C) | MONITOR FACILITY ENVIRONMENTAL CONDITIONS | - | PENDING |

FIG. 5B

TASK: VISUAL INVENTORY INSPECTION (SCHEDULE 1)
504

| ACTION | ACTION DESCRIPTION | INVENTORY | DATA INTEGRATION | COMPLIANCE STATUS |
|---|---|---|---|---|
| 1 | VISUAL INSPECTION | SEEDS | YES | YES |
|  |  | TRAYS | ACTIVE | ACTIVE |
| ⋮ | ⋮ | ⋮ | - | INACTIVE |
|  |  | RAFTS | - | INACTIVE |
| 2 | AUTOMATED INSPECTION | MEDIA | - | INACTIVE |
|  |  | FERTILIZER | ACTIVE | ACTIVE |
| ⋮ | ⋮ | ⋮ | - | INACTIVE |
|  |  | PESTICIDES | - | INACTIVE |

FIG. 5C

DECENTRALIZED GOVERNANCE REGULATORY COMPLIANCE (D-GRC) CONTROLLER

BACKGROUND

Agricultural safety is an imperative element of an agricultural operation. Agricultural safety control requirements are typically developed to protect plant-based products at each segment of an agricultural operation. From the germination of crop seeds through the delivery of plant-based products to retail outlets, each segment of an agricultural operation is governed by requirements that protect an agricultural product from contamination or unsafe conditions that could compromise agricultural quality.

Agricultural safety control requirements are typically developed by collecting data within each segment of an agricultural operation and performing a hazard analysis and/or risk assessment. In this way, an agricultural compliance plan (ACP) can be developed with the knowledge of what segments require oversight and control. Historically, agricultural safety control requirements are collected in real-time by persons verifying or carrying out discrete tasks of an ACP. An establishment tasked with oversight, control, or performance of a segment of an agricultural operation, may need to demonstrate that proper ACP procedures were followed while the agricultural operation was under their control. Establishment personnel may manually gather and record relevant data that show compliance with the ACP.

However, as technology streamlines agricultural operations, making each segment of an agricultural operation less dependent on human interactions, there remains a need for agricultural safety controls to evolve in such a way that each segment of an agricultural operation can be monitored, and data collated, to demonstrate compliance with agricultural safety control requirements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2A illustrates a block diagram of an interaction and consensus of a distributed ledger among D-GRC controllers. FIG. 2B illustrates a block diagram of a distributed ledger that comprises a blockchain. FIG. 2C represents a block diagram of the initial block. FIG. 2D represents a block diagram of the first block.

FIGS. 5A through 5C illustrate exemplary embodiments of the ACP. FIG. 5A illustrates an exemplary compliance plan that includes a plurality of schedules. FIG. 5B illustrates an exemplary schedule of the compliance plan that includes a plurality of tasks. FIG. 5C illustrates an exemplary task that includes a plurality of actions.

DETAILED DESCRIPTION

Figure 1:
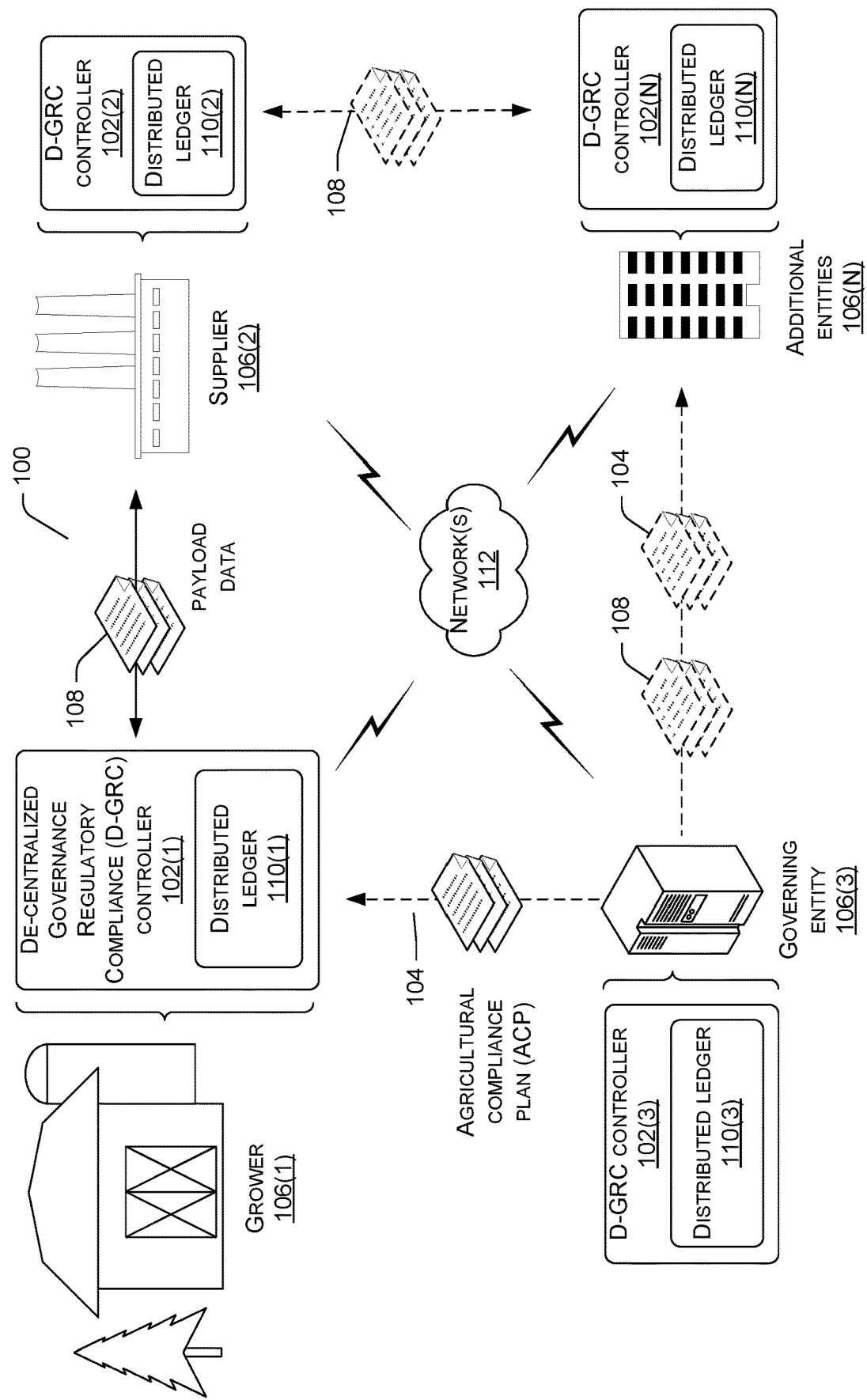
FIG. 1 illustrates an exemplary computing environment for a De-centralized Governance Regulatory Compliance (D-GRC) Controller.

This disclosure describes techniques for dynamically monitoring and collating data associated with an agricultural operation for the purpose of demonstrating compliance with an agricultural compliance plan (ACP). More specifically, a decentralized governance compliance (D-GRC) controller is described that is configured to generate a distributed ledger that dynamically processes compliance of individual actions associated with an ACP. The distributed ledger may be configured to track regulatory compliance associated with a cycle of agricultural activities associated with an agricultural product. Agricultural activities may include an inventory inspection of agricultural products, a facility inspection of a facility used for an agricultural operation, or vehicle inspection of vehicles used to transport agricultural products. Further, the distributed ledger may be configured to automate the governance of an ACP across various entities such that are each a compliant or non-compliant response from an entity and automatically trigger an update to the ACP. An update to the ACP may indicate compliant tasks, compliant schedules, pending tasks, pending schedules, or any combination thereof.

In various examples, the D-GRC controller can benefit agricultural operations by generating a granular record of activities (i.e. a chain of custody) associated with an agricultural product from seed germination through to harvest and marketplace shipment. In the event that a defect is found in the agricultural product, an auditor or interested party may use the record of activities to help identify the origin of the defect.

The record of activities may include plant-specific or plant, batch-specific records such as a record of seeds provided by a particular supplier, data relating to seed germination that occurred at a particular grower facility using particular fertilizer and/or other plant growth resources, information relating to particular supplier(s) that provided plant growth resources, records of inventory and facility inspections performed by particular personnel on particular days and times, and so forth.

In one example, the D-GRC controller may generate an ACP that is intended to track the monitoring of an agricultural operation through various agricultural cycles, such as seed management, plant growth, plant harvest, and shipment to the marketplace. In each agricultural cycle, individual schedules may be developed to monitor the integrity and health of the agricultural operation during a specific agricultural cycle. In one non-limiting example, seed management may include a plurality of processes that monitor and nurture the initial development of a plant from a seed, cutting, or tissue culture. The term "seed" refers to a plant's unit of reproduction that develops into another such plant.

The term "cutting" refers to pieces of a plant that are intentionally used to create clones of the parent plant. The term "tissue culture" refers to the growth of plant tissue or cells in an artificial medium that is separate from the parent plant. Each of these processes, collectively, enable the initial development of the plant and thus are within the scope of seed management, as described herein.

In some examples, individual schedules of an ACP may be based on governmental and/or non-governmental safety rules and industry best practices. For example, agricultural safety rules may establish science-based minimum standards for safe growing, harvesting, packaging, and storage of agricultural products grown and/or developed for human use and/or consumption. These agricultural safety rules may set science-based criteria to test product quality and safety at each agricultural cycle. By incorporating the agricultural safety rules within an ACP, the progress of an agricultural operation can be monitored and assessed against each agricultural safety rule and throughout each agricultural cycle.

In various examples, the ACP may include a list of tasks for each schedule that requires completion for the schedule to be deemed compliant. For example, a "seed management schedule" may include a task to visually inspect inventory, capture inventory code, monitor water conditions, and/or so forth. In some cases, tasks may be performed concurrently. In other examples, the tasks may be performed sequentially based on the completion of prerequisite tasks. For example, capturing inventory code may occur only after a visual inspection of the inventory.

The ACP, or update thereof, may indicate that a complying entity may interact with a participating entity to gather data to show compliance with the next task. A complying entity may be an entity that is responsible for providing evidence of compliance with a task while a participating entity is an entity with whom the complying entity may interact to gather data to show compliance. A complying entity may also be a participating entity with regards to evidencing compliance of another task. Also, a participating entity may also be a complying entity with regards to showing compliance with another task.

In various examples, the ACP may be stored on a distributed ledger. The distributed ledger may reside on one or more D-GRC controller(s) associated with complying entities and participating entities. The distributed ledger may be accessible to complying entities and participating entities that are included within a permissions schedule that authorizes and controls entity read-write access to the ACP.

The distributed ledger may be a data structure that is used to store data records associated with the ACP. Generally, distributed ledger systems are configured to store tamper-resistant records of previously verified transactions or computer code executions. One example of a distributed ledger is a blockchain. A blockchain comprises a series of connected data structures, referred to as blocks. Each block contains a set of one or more data records and a header. The header includes a hash derived from the payload of the block and a hash of the previous block.

The distributed ledger may include a protocol that simulates a workflow for compliance of each task and corresponding schedule within the ACP. The workflow may include algebraic expressions that represent the tasks and schedules of the ACP. For example, the distributed ledger may include computer-executable code that enables entities to input data entries associated with compliance or non-compliance with the ACP. The distributed ledger may be configured to automatically analyze the data entries, determine a compliance state, and publish updated data entries to other nodes with permissions to access the distributed ledger.

Referring back to the distributed ledger of the ACP, each block within the blockchain may correspond to a task or schedule of the ACP. Thus, a data entry within each block of the blockchain may support compliance or non-compliance with a task or schedule. In one example, a D-GRC controller may execute the distributed ledger and identify a next pending task within the ACP. In doing so, the D-GRC controller may generate, with or without user interaction, payload data associated with the pending task. The payload data may include an upload of data (i.e. multimedia) associated with compliance of a pending task, a statement of compliance and/or non-compliance, a record of an interaction (i.e. capture by a monitoring agent) between the entity and another entity, such as a participating entity, or any combination thereof.

The D-GRC controller may use one or more trained machine learning algorithms to analyze the payload data and infer a likely impact of the payload data on a task or schedule of the ACP. The likely impact may correspond to a demonstration of compliance of the pending task, non-compliance of the pending task, a revocation of compliance of a compliant task, or an incremental data entry associated with a pending task (i.e. monitored interaction between a complying entity and participating entity).

The D-GRC controller may then create an updated ACP by updating the ACP within the distributed ledger from an initial state to a new state (i.e. generating a block within the blockchain), based on the analysis of the payload data. By way of example, an initial state may correspond to an instance of the ACP that identifies a pending visual inspection task of a grower's operation, and the new state may indicate a condition whereby the pending visual inspection task is now compliant.

The D-GRC controller may encode the updated ACP into the distributed ledger by generating a data structure, such as a block within a blockchain. The data structure (i.e. block) acts to replace the initial ACP with the updated ACP. Therefore, a subsequent invocation of the ACP by any entity via the distributed ledger acts to invoke the updated ACP, rather than the initial ACP.

In various examples, the distributed ledger may be used to maintain traceability of physical specimens of agricultural products during the cycle of agricultural activities by fitting each agricultural product with a Radio Frequency (RF) tag or a Quick Response (QR) code tag. The RF tag and the QR code tag may be used to record uniquely identifiable growth characteristics of an agricultural product. In this way, a recipient of an agricultural product can confirm that the received condition of the agricultural product is the same, or substantially similar, to the sent condition. In one example, the identifiable growth characteristics may include a plant identifier, plant measurements (i.e. height and weight), plant color, and/or so forth. The identifiable growth characteristics may be stored within a payload message that is subsequently stored in a block (i.e. data structure) of a blockchain associated with the ACP.

By way of example, the RF tag may include a copy of the block hash of the block that includes the payload message with the identifiable growth characteristics. Accordingly, a receiving entity of the agricultural product may compare the hash stored within the RF tag with the hash of each block of the blockchain. A match verifies an association between the block of the blockchain and the agricultural product. In this way, the block hash stored within the RF tag acts as a unique identifier of the block that includes the identifiable growth characteristics. Accordingly, the receiving entity may discern the identifiable growth characteristics of the agricultural product from the content of the block, provided the entity retains the requisite access privileges to access the block of the blockchain.

Throughout this disclosure, the terms "crop," "agriculture," "agricultural product," and "plant", describe fruits, vegetables, or any other agricultural product that is intended for human use or consumption. Further, the term "techniques," as used herein, may refer to system(s), method(s), computer-readable instruction(s), module(s), algorithms, hardware logic, and/or operation(s) as permitted by the context described above and through the document.

FIG. 1 illustrates an exemplary computing environment 100 for De-centralized Governance Regulatory Compliance (D-GRC) Controller(s) 102(1)-102(N). The D-GRC controller(s) 102(1)-102(N) may act as a decentralized server tasked with governance of a cycle of agricultural activities for a crop. In various examples, D-GRC controller(s) 102(1)-102(N) may be tasked to support compliance and implementation of an agricultural compliance plan (ACP) 104 that governs growth practices for particular crops. Growth practices may vary by region and commodity. As part of supporting compliance, the D-GRC controller(s) 102(1)-102(N) may be associated with disparate entities that interact with an agricultural product within the agricultural cycle. The agricultural cycle may include activities relating to seed germination, growth, harvest, and shipment of an agricultural product from a grower 106(1) to a storage facility or a merchant storefront. Therefore, to monitor compliance of each activity, the D-GRC controller(s) 102(1)-102(N) may interact with various entities such as, but not limited to, a grower 106(1), a supplier 106(2), a governing entity 106(3), or additional entities 106(N). The governing entity 106(3) may correspond to an entity that initially establishes an ACP 104 that governs growth practices for particular crops. The governing entity 106(3) may also monitor and generate updates to the task and schedule requirements of the ACP 104 in near/real-time. Additional entities 106(N) may correspond to a third-party auditor, retailer, or a transport company tasked with shipping an agricultural product from the grower 106(1), supplier 106(2), a merchant or storefront.

In various examples, each D-GRC controller(s) 102(1)-102(N) may gather compliance-related information at the entity within which the D-GRC controller(s) 102(1)-102(N) resides. More specifically, a monitoring agent that resides within each D-GRC controller(s) 102(1)-102(N) may be configured to detect and intercept payload data 108 associated with compliance of a pending task and/or schedule of the ACP 104. The payload data 108 may correspond to payload message(s) sent between entities, such as the grower 106(1) and the supplier 106(2), as illustrated in FIG. 1. In other examples, the payload data 108 may correspond to compliance statements recorded within the ACP 104.

In the illustrated example, a governing entity 106(3) may generate an ACP 104 based on governmental and/or non-governmental safety rules and industry best practices. The ACP 104 may include a list of tasks and schedules, each of which requires compliance, for the ACP 104 to be deemed, compliant. The governing entity 106(3) may further generate a permissions schedule that authorizes and controls entity read-write access to the ACP 104. For example, a complying entity responsible for showing compliance with a pending task or a pending schedule may have read-write access to the ACP 104, or portion thereof (i.e. a pending task or schedule), while a participating entity responsible for providing data to support compliance may only have read access to the ACP 104, or portions thereof.

Each D-GRC controller(s) 102(1)-102(N) may include a copy of a distributed ledger(s) 110(1)-110(N), which is shared across disparate entities. The distributed ledger(s) 110(1)-110(N) corresponds to a database that is configured to replicate, save, and update across shared disparate entities, via a consensus algorithm. The distributed ledger(s) 110(1)-110(N) may include a copy of the permissions schedule and the ACP 104. In the illustrated example, the governing entity 106(3) may generate an initial copy of the distributed ledger(s) 110(1)-110(N), which is subsequently shared, via the consensus algorithm, with other entities including the grower 106(1), the supplier 106(2), and additional entities 106(N).

In the illustrated example, each of the D-GRC controller(s) 102(1)-102(N) may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s) 112. The one or more network(s) 112 may include public networks such as the Internet, private networks such as an institutional and/or personal intranet, or some combination of private and public networks. The one or more network(s) 112 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, LTE, 5G NR-LTE, and so forth), or any combination thereof.

FIGS. 2A through 2D illustrate block diagrams of a decentralized distributed ledger that produces a consensus of an agricultural compliance plan (ACP) 104 across a plurality of entities. In the illustrated example a distributed ledger 202 may correspond to one of distributed ledger(s) 110(1)-110(N). More specifically, the distributed ledger 202, as defined herein, may correspond to a consensus of replicated, shared, and synchronized data that is geographically spread across multiple D-GRC controller(s) 102(1)-104(N). Unlike a centralized system, the consensus of the distributed ledger 202 requires no central administrator or centralized data storage.

Specifically, the distributed ledger 202 corresponds to a database that is spread across several nodes, such as the D-GRC controller(s) 102(1)-102(N) via a peer-to-peer network. Each of the D-GRC controller(s) 102(1)-102(N) may replicate, save, and update an identical copy of the distributed ledger 202 via a consensus algorithm common to each of the D-GRC controller(s) 102(1)-102(N).

Figure 2A:
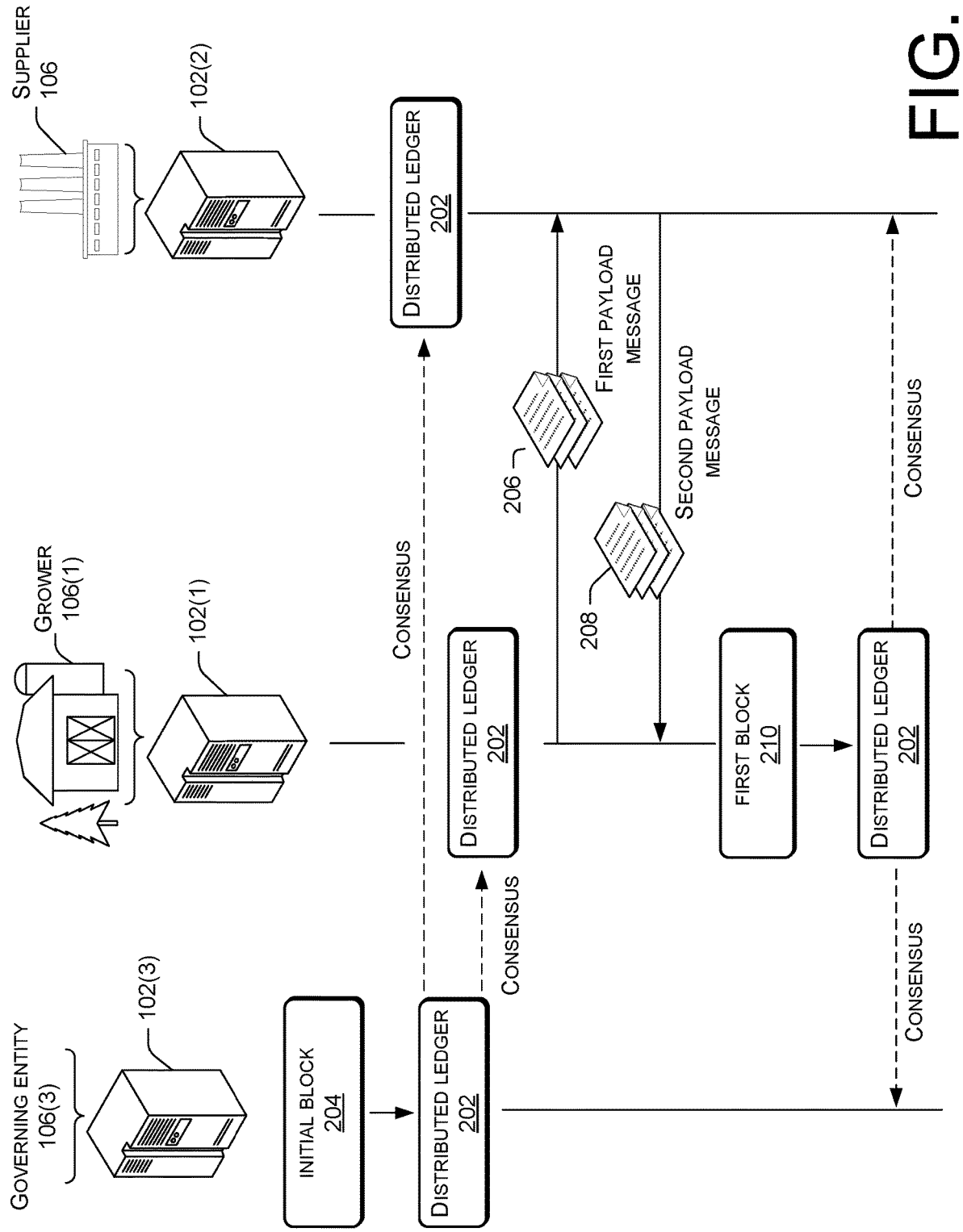
FIGS. 2A through 2D illustrate block diagrams of a decentralized distributed ledger that produces a consensus of an agricultural compliance plan (ACP) across a plurality of entities.

FIG. 2A illustrates a block diagram of an interaction and consensus of a distributed ledger among D-GRC controllers 102(1)-102(N). Referring to FIG. 2A, the D-GRC controller 102(3), associated with a governing entity 106(3), may generate an initial data structure associated with the ACP 104. The initial data structure may include an initial instance of the ACP 104 and a permissions schedule. The ACP 104 may be developed to monitor each phase of an agricultural operation from seed management through to marketplace shipment. The ACP 104 may include a plurality of schedules that each reflect a divisible phase of an agricultural operation, such as seed management, plant growth, plant harvest, and agricultural shipment. The permissions schedule may include an authorization list. The authorization list may identify one or more entities that are authorized to access, upload, download, and modify the ACP 104 via the distributed ledger. The construct of the initial block 204 is described in further detail with reference to FIG. 2C.

The D-GRC controller 102(3) may replicate the initial data structure across each of the D-GRC controller(s) 102(1)-102(N) via the consensus algorithm native to the distributed ledger 202 at each of the D-GRC controller(s) 102(1)-102(N).

In the illustrated example of FIG. 2A, a grower 106(1) may access the ACP 104 via the distributed ledger 202 and identify a pending task for which the grower is identified as the complying entity. The grower 106(1) may initiate an interaction with another entity, such as a supplier 106(2), by sending the supplier 106(2) a first payload message 206. In this example, the grower 106(1) may be a complying entity that is responsible for showing compliance with a pending task of the ACP 104. The supplier 106(2) may be a participating entity with whom the grower 106(1) (i.e. complying entity) intends to gather data to show compliance with the pending task. A monitoring agent may reside at each of the D-GRC controller(s) 102(1)-102(N). Therefore, at the grower 106(1), the monitoring agent at the D-GRC controller 102(1) may be configured to detect and record interactions between the grower 106(1) and supplier 106(2). The monitoring agent may be further configured to automatically associate the interaction with a currently pending task of the ACP 104. Alternatively, the monitoring agent may prompt the entity that initiated the interaction (i.e. the grower 106(1)) to select a pending/compliant task to associate with the interaction.

In response to the grower 106(1) transmitting the first payload message 206 to the supplier 106(2), the supplier 106(2) (i.e. participating entity) may transmit a second payload message 208 to the grower 106(1) (i.e. complying entity) in reply to the initial request. The second payload message 208 may include the data with which the grower 106(1) is to show compliance with a pending task of the ACP 104.

The monitoring agent associated with the D-GRC controller 102(1) may capture and record the first payload message 206 and the second payload message 208 within a data structure of the distributed ledger 202 for the purpose of maintaining a chain of custody of data and data-related interactions associated with the ACP 104. The D-GRC controller 102(1) may use one or more trained machine-learning algorithms to analyze the payload data to infer a likely impact of the first payload message 206 and the second payload message 208 on a pending task of the ACP 104. The likely impact may correspond to a demonstration of compliance, non-compliance, a revocation of compliance, or an incremental data entry associated with a pending task.

The D-GRC controller 102(1) may encode an update to the ACP 104 into the distributed ledger by generating a data structure, such as a block within a blockchain. The data structure (i.e. block) acts to replace the initial ACP 104 within the initial block 204, with an updated ACP 104 within a first block 210. The first block 210 may further include an update to the pointer address of the ACP 104 such that a subsequent invocation of the ACP 104, by the same or another entity (i.e. complying entity, participating entity, and/or auditing entity), accesses the new state of the updated ACP 104, rather than the initial state. The construct of the first block 210 is described in further detail with reference to FIG. 2D.

The D-GRC controller 102(1) associated with the grower 106(1) may replicate the first block 210 across each of the D-GRC controller(s) 102(1)-102(N) via the consensus algorithm native to the distributed ledger 202.

Figure 2B:
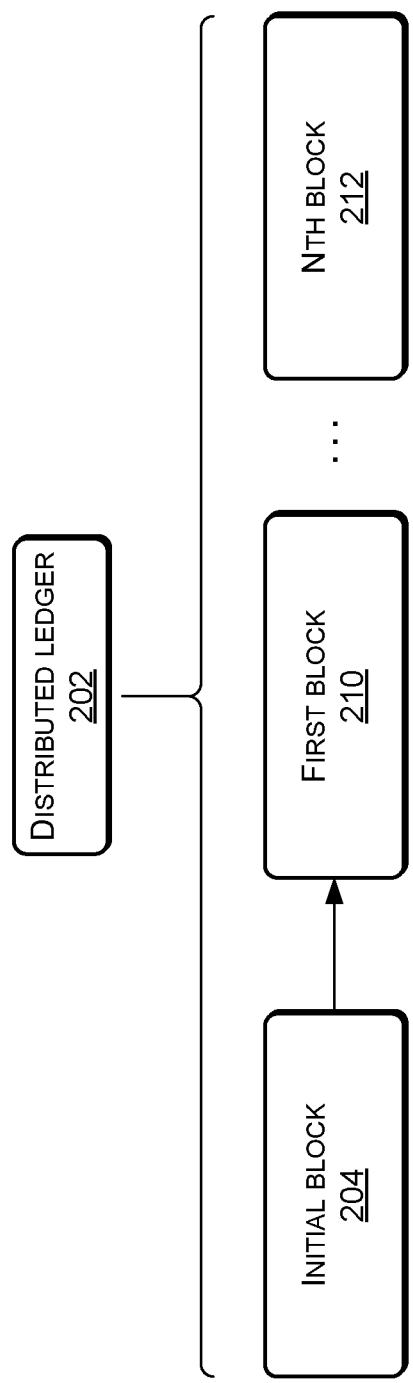

FIG. 2B illustrates a block diagram of a distributed ledger 202 that comprises a blockchain. The blockchain includes a plurality of blocks (i.e. data structures), namely the initial block 204, the first block 210, and the nth block 212. Each block represents an update to the state of the ACP 104 relative to the previous state captured in the preceding block. For example, the initial block 204 represents an initial instance of the ACP 104, and the subsequent block, namely the first block 210, represents an update to the initial instance of the ACP 104. By way of example, the change in status may reflect a change in status of a task from pending to compliant or vice versa.

The blockchain may include nth blocks, as illustrated in FIG. 2B by the nth block 212. The nth block 212 represents the final state of the ACP 104, whereby progress through the ACP 104 is complete (i.e. compliance shown for tasks and schedules) or has been retired (i.e. failed agricultural product terminates progress through ACP 104).

Figure 2C:
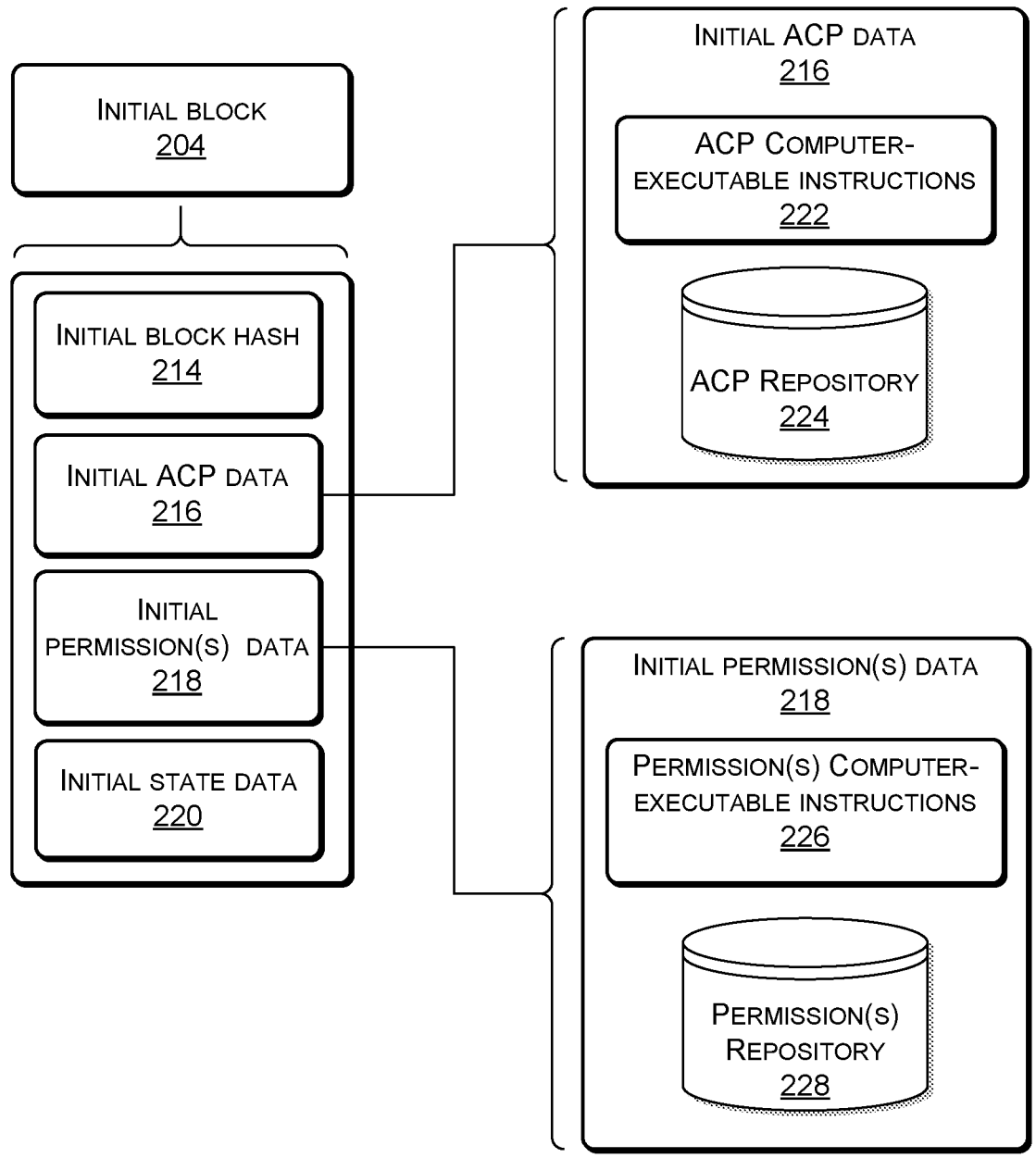

FIG. 2C represents a block diagram of the initial block 204. The initial block 204 may include an initial block hash 214, initial ACP data 216, initial permission(s) data 218, and initial state data 220. The initial block hash 214 may correspond to a cryptographic hash of the content of the initial block 204, namely the initial ACP data 216, the initial permission(s) data 218, and the initial state data 220. By way of example, the initial block hash 214 may be generated using a digital signature algorithm such as HMAC with SHA256, ECDSA, or RSASSA-PSS.

The initial ACP data 216 may comprise ACP computer-executable instructions 222 and an ACP repository 224. The ACP computer-executable instructions 222 may be configured to dynamically retrieve a current instance of the ACP stored within the ACP repository 224. In the illustrated example of FIG. 2C, the current instance of the ACP may correspond to the initial instance of the ACP. Therefore, the current instance of the ACP may identify a first task of a first schedule that awaits compliance by a first complying entity. The ACP repository 224 may include a record of the current instance of the ACP. It is noteworthy that the ACP repository 224 is also configured to store historical instances of the ACP.

The initial permission(s) data 218 may comprise permission(s) computer-executable instructions 226 and a permission(s) repository 228. The permission(s) computer-executable instructions 226 may be configured to dynamically retrieve a current instance of the permission(s) schedule stored within the permission(s) repository 228. In the illustrated example of FIG. 2C, the current instance of the permission(s) schedule may correspond to the initial instance of the permission(s) schedule. The permission(s) repository 228 may include a record of the current instance of the permission(s) schedule. It is noteworthy that the permission(s) repository 228 is also configured to store historical instances of the permission(s) schedule.

The initial state data 220 may include pointer address data that is associated with the current ACP and the current permission(s) schedule. For example, the initial state data 220 may include a first pointer address to the current ACP (i.e. initial ACP as defined in FIG. 2C) in the ACP repository 224, and a second pointer address to the current permission(s) schedule (i.e. initial permission(s) schedule as defined in FIG. 2C) in the permission(s) repository 228.

Figure 2D:
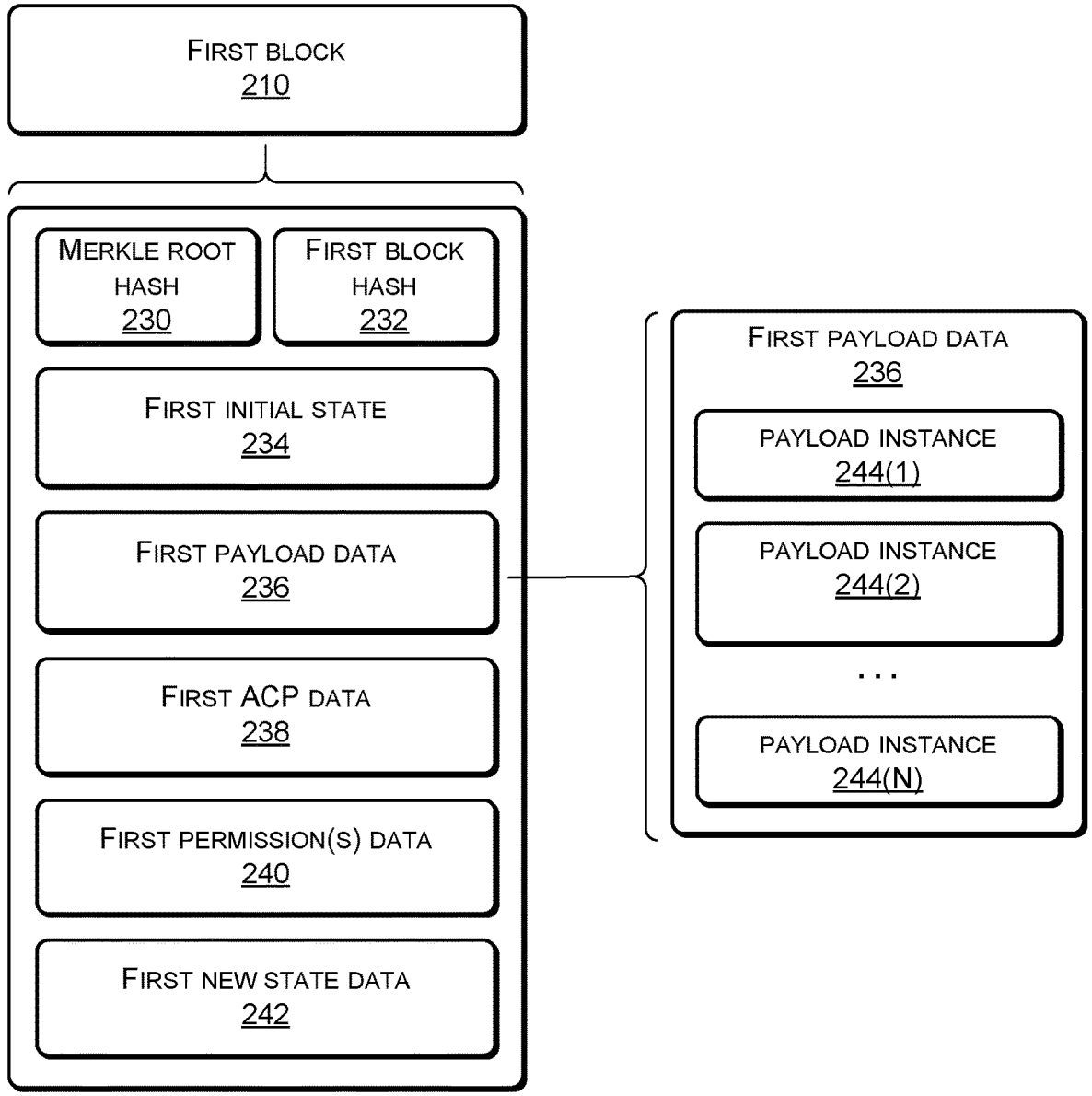

FIG. 2D represents a block diagram of the first block 210. As noted in FIG. 2A, the first block 210 is a next subsequent block that follows the initial block described in FIG. 2C.

Referring to FIG. 2D, the illustrated example of the first block 210 includes various steps that are the same or substantially similar to the initial block 204 described with reference to FIG. 2C. As such, for brevity and ease of description, various details relating to the first block 210, as described in FIG. 2D, are omitted herein to the extent that the same or similar details have been provided above in relation to the initial block 204 of FIG. 2C.

The first block 210 may include a first Merkle Root hash 230, a first block hash 232, a first initial state 234, first payload data 236, first ACP data 238, first permission(s) data 240, and first new state data 242. The first Merkle Root hash 230 corresponds to a copy of the cryptographic hash of the preceding block within the blockchain, which in this case corresponds to the initial block hash 214. As the blockchain grows, each subsequent block within the blockchain includes a Merkle Root hash of its immediately preceding block, meaning the Merkle Root hash evolves with each block of the blockchain and consistently corresponds to a hash of all preceding blocks relative to a current block. The first block hash 232 corresponds to a cryptographic hash of the content of the current block, which includes the first Merkle Root hash 230 (i.e. the block hash of its immediately preceding block). In this way, two blocks within a blockchain cannot have the same block hash. In this example, the first block hash 232 corresponds to a hash of the first Merkle Root hash 230, the first initial state 234, the first payload data 236, the first ACP data 238, the first permission(s) data 240, and the first new state data 242. The first block hash 232 may be generated using a digital signature algorithm such as HMAC with SHA256, ECDSA, or RSASSA-PSS.

The first initial state 234 may include pointer address data that establishes a starting point for the ACP and permission(s) schedule within the first block 210. More specifically, the first initial state 234 may correspond to the previous block's new state, which in this instance corresponds to the initial state data 220 of the initial block 204. In this example, the first initial state 234 may include a first pointer address data to the initial ACP and a second pointer address to an initial permission(s) schedule, as sourced from the initial state data 220.

The first payload data 236 may include payload instance(s) 244(1)-244(N) that are generated during the course of showing compliance with a pending task or a pending schedule of the ACP. The payload instance(s) 244(1)-244(N) may include an upload of data (i.e. multimedia) associated with compliance of a pending task, a statement of compliance and/or non-compliance, a record of an interaction (i.e. capture by a monitoring agent) between the entity and another entity, such as a participating entity, or any combination thereof.

The first ACP data 238 may include an updated ACP stored within the ACP repository 224. More specifically, a D-GRC controller may generate the updated ACP based on an analysis of the first payload data 236. The D-GRC controller may employ one or more machine-learning algorithms to analyze the first payload data 236 to infer a likely impact on a pending task of the ACP. The likely impact may correspond to a demonstration of compliance, non-compliance, a revocation of compliance, or an incremental data entry associated with a pending task. As such, the D-GRC controller may incorporate an update to the ACP that is consistent with the likely impact and store the updated ACP within the ACP repository 224.

Similarly, the first permission(s) data 240 may include an updated permission(s) schedule stored within the permission(s) repository 228. More specifically, a D-GRC controller may generate the updated permission(s) schedule based on an analysis of the first payload data 236. The D-GRC controller may employ one or more machine-learning algorithms to analyze the first payload data 236 to infer a likely impact on the permission(s) schedule. The likely impact may correspond to a change in access privileges (i.e. create, read, update, or delete privileges) associated with a complying entity, participating entity, or an auditing entity. As such, the D-GRC controller may incorporate an update to the permission(s) schedule that is consistent with the likely impact and store the updated permission(s) schedule within the permission(s) repository 228.

The first new state data 242 may include pointer address data that is associated with the updated ACP and the updated permission(s) schedule. For example, the first new state data 242 may include a first pointer address to the updated ACP in the ACP repository and a second pointer address to the updated permission(s) schedule in the permission(s) repository 228.

It is noteworthy that state blocks subsequent to the first block 210, such as nth block 212, comprises of a substantially similar data structure to that of the first block 210. As such, for brevity and ease of description, a further description of blocks subsequent to the first block 210 is omitted herein since the same or similar details have been provided in relation to FIG. 2D.

Figure 3:
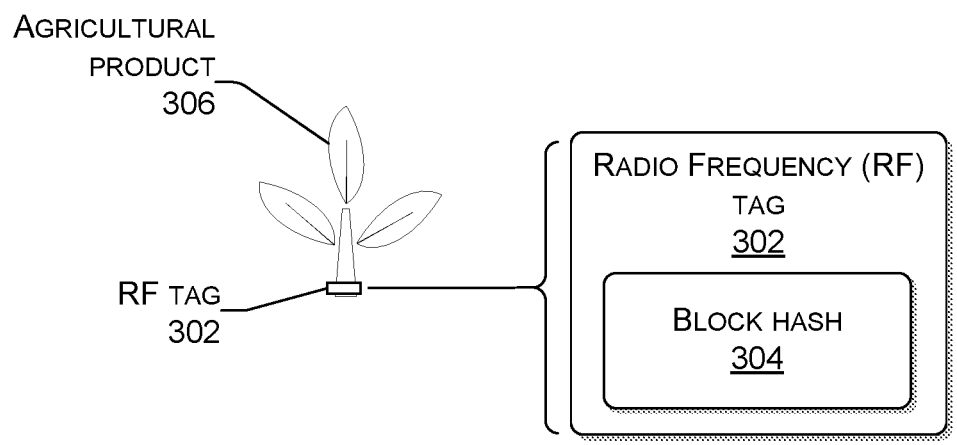
FIG. 3 illustrates a physical specimen of a plant-based product that is fitted with a Radio Frequency (RF) tag.

FIG. 3 illustrates a physical specimen of a plant-based product that is fitted with a Radio Frequency (RF) tag. The RF tag 302 is intended to store a block hash 304 of a block of a blockchain that is associated with the agricultural product 306.

In one example, when an agricultural product 306 is shipped between entities, such as between a greenhouse and retail outlet, agricultural safety requirements may mandate traceability of the shipment (i.e. agricultural products) during the transport phase. Compliance may mandate a record of identifiable growth characteristics such as plant identifiers (i.e. crop identifiers, greenhouse identifiers, batch identifiers), plant characteristics (i.e. plant weight), and/or any other uniquely identifiable growth parameter. An RF tag 302 may be used to store and/or reference to such information. The RF tag 302 may be physically tied to each agricultural product (or grouping thereof) such that the identifiable growth characteristics are physically accessible at the agricultural product while it is being moved between locations. Storing such information on an RF tag 302, or similar device can be made in human-readable form or machine-readable form. Storing such information in human-readable form may require the RF tag 302 to include a Central Processing Unit (CPU) that is more powerful than a counterpart RF tag 302 that is configured to store the information in a machine-readable form. Therefore, to reduce the relative power requirements of a CPU of the RF tag 302, the identifiable growth characteristics may be stored in the RF tag 302 as a hash (i.e. machine-readable form). Doing so may reduce the relative power requirements of the CPU of the RF tag 302, which further reduces the cost of the RF tag 302 and improves a likely adoption rate of the technology.

The hash stored within the RF tag 302 may correspond to the block hash of the block within the blockchain that includes the identifiable growth characteristics. In this example, the identifiable growth characteristics may be stored within a block as a payload message. The block may include a hash of its contents, which includes the identifiable growth characteristics. Thus, by storing the block hash within the RF tag, the block hash acts as a block identifier that can be used to identify which block within the blockchain contains the identifiable growth characteristics. Since an inherent property of blockchain is that two blocks within a blockchain cannot have the same block hash (i.e. the block hash of each block includes the Merkle Root hash of its preceding blocks, thus all preceding blocks), the block hash becomes a reliable identifier of the block containing the identifiable growth characteristics.

The purpose of uploading a block hash 304 onto the RF tag 302 is to generate an association between the agricultural product 306 (i.e. RF tag) and the block (i.e. via the block hash 304) that includes the identifiable growth characteristics. In this way, the block hash stored within the RF tag acts as a unique identifier of the block that includes the identifiable growth characteristics. Accordingly, an entity that receives the agricultural product 306 can compare the block hash 304 stored within the RF tag 302 with the block hashes of the blockchain to identify a match. A match verifies the association between the RF tag 302 and the block of the blockchain. Accordingly, the receiving entity may discern the identifiable growth characteristics of the agricultural product from the content of the block, provided the entity retains the requisite access privileges to access the block of the blockchain.

Consider the following example. A sending entity may generate and store identifiable growth characteristics of an agricultural product 306 as payload data within a block of a blockchain. The identifiable growth characteristics may include a weight and plant identifier of an agricultural product 306 shipped to a receiving entity. Upon receipt of the agricultural product, the receiving entity may compare the block hash stored within the RF tag of the agricultural product with block hashes within a blockchain associated with the ACP. A match verifies an association between the agricultural product 306 and the ACP. Stated another way, a match between the block hash 304 stored within the RF tag 302 and a block hash of a block of the blockchain associated with the ACP, implicitly verifies the origin of the agricultural product 306. The receiving entity may then access the content of the block associated with the block hash (i.e. retrieved from the RF tag 302) to verify the weight and plant identifier of the agricultural product 306, as it was shipped by the sending entity, provided the receiving entity has the requisite access privileges to access the block of the blockchain.

Figure 4:
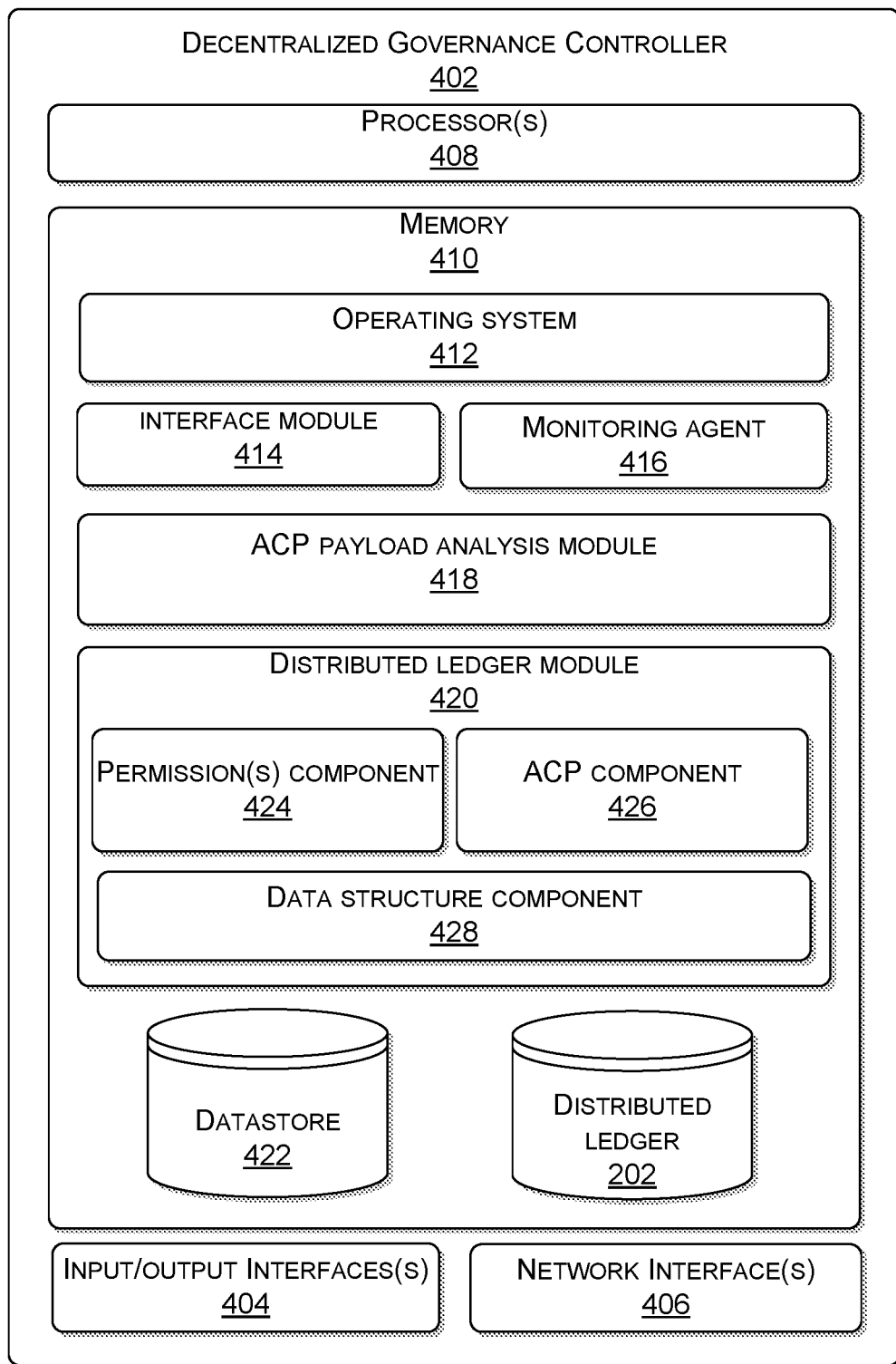
FIG. 4 illustrates a block diagram of various components of a D-GRC controller.

FIG. 4 illustrates a block diagram of various components of a D-GRC controller. The D-GRC controller 402 is configured to generate and maintain a distributed ledger 202 that dynamically processes compliance of individual actions associated with an ACP. The distributed ledger 202 may be configured to track regulatory compliance associated with a cycle of agricultural activities associated with an agricultural product. Further, the distributed ledger may be configured to automate the governance of an ACP across various entities, such that each compliant or non-compliant response from an entity, automatically triggers an update to the ACP.

The D-GRC controller 402 may correspond to one of D-GRC controller(s) 102(1)-102(N). Further, the D-GRC controller 402 may include input/output interface(s) 404. The input/output interface(s) 404 may include any type of output interface known in the art, such as a display (e.g. a liquid crystal display), speakers, a vibrating mechanism, or a tactile feedback mechanism. Input/output interface(s) 404 also include ports for one or more peripheral devices, such as headphones, peripheral speakers, or a peripheral display. Further, the input/output interface(s) 404 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the D-GRC controller 402 may include network interface(s) 406. The network interface(s) 406 may include any sort of transceiver known in the art. For example, the network interface(s) 406 may include a radio transceiver that performs the function of transmitting and receiving radio frequency communications via an antenna. In addition, the network interface(s) 406 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 406 may include wired communication components, such as an Ethernet port or a Universal Serial Bus (USB).

The D-GRC controller 402 may include one or more processor(s) 408 that are operably connected to memory 410. In at least one example, the one or more processor(s) 408 may be a central processing unit(s) (CPU), graphics processing unit(s) (GPU), or both a CPU and GPU or any other sort of processing unit(s). Each of the one or more processor(s) 408 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 408 may also be responsible for executing all computer applications stored in the memory, which can be associated with common types of volatile (RAM) and/or non-volatile (ROM) memory.

In some examples, memory 410 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 410 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 410 may include an operating system 412, an interface module 414, monitoring agent 416, ACP payload analysis module 418, distributed ledger module 420, and a distributed ledger 202, and a data store 422. The operating system 412 may include an interface layer that enables applications to interface with input/output interface(s) 404 and the network interface(s) 406. The interface layer may comprise public APIs, private APIs, or a combination of both. Additionally, the operating system 412 may include other components that perform various other functions generally associated with an operating system.

The interface module 414 may be configured to receive an input from an administrator and/or operator of the D-GRC controller 402. An example input may include, but is not limited to, annotations associated with a task of an ACP, multimedia data (i.e. video, images, audio, etc.) that relates to the compliance of a pending task of the ACP, or a combination of both. Additionally, an input may retract the compliance state of a compliant task. A retraction of compliance may occur for several reasons, namely a mistaken or inadvertent assertion of compliance or the occurrence of an intervening act that invalidates the original compliance.

An example input may also include payload messages that are intended for delivery to a participating entity or a complying entity. The interface module 414 may intercept an API call to generate a payload message or a system call to deliver the payload message.

Another example input may correspond to updated safety rules associated with the ACP. The updated safety rules may impact pending tasks and compliant tasks of the ACP. The updated safety rules may be received as a user input from a government body, an operator of the grower's operation, or a non-government industry body responsible for setting best practices for agricultural operations. Additionally, the example input may also include identifying types of data that are to be captured to evidence compliance with an agricultural safety requirement. For example, an agricultural safety requirement may require an inspection of a transport vehicle prior to the shipment of agricultural products. Thus, an operator or administrator may request, via the interface module 414, evidence of compliance with the agricultural safety requirement. In this example, evidence may include a visual inspection of an empty trailer prior to loading the shipment, an image of the empty trailer prior to loading the shipment, proof of environmental conditions within the trailer, such as temperature, moisture, ambient light intensity, etc., or any combination thereof.

The monitoring agent 416 may intercept Application Programming Calls (API) calls and system calls that create, read, update, or delete payload data associated with compliance of a pending/compliant task and/or schedule of the ACP. The monitoring agent 416 may monitor the interface module 414 to detect the receipt of payload data from another D-GRC controller. Alternatively, the payload data may constitute an interaction (i.e. create, read, update, or delete) with the ACP at the instant D-GRC controller 402 within which the monitoring agent 416 resides. An interaction with the ACP may correspond to a data entry associated with a pending/compliant task recorded within the ACP via the interface module 414.

The monitoring agent 416 may monitor the interface module 414 on a continuous basis, per a predetermined schedule, or in response to a triggering event. The predetermined schedule may correspond to time intervals of one hour, six hours, or 12 hours, however, any time interval is possible. The triggering event may correspond to receipt of payload data from another D-GRC controller or intercepting an API call or system call with payload data at the instant D-GRC controller 402, within which the monitoring agent 416 resides.

The ACP payload analysis module 418 may employ one or more trained machine-learning algorithms to analyze payload data to infer an association of the payload data with a pending task and/or pending schedule of the ACP. For example, the monitoring agent 416 may detect payload data that constitutes a data entry for a pending task and/or pending schedule. Thus, the ACP payload analysis module 418 may automatically associate the payload data with the pending/compliant task and/or schedule of the ACP.

In another example, the ACP payload analysis module 418 may also infer an association between the payload data and a currently pending/compliant task and/or schedule of the ACP based on an identity of the entity associated with the D-GRC controller 402. For example, a pending/compliant task and/or schedule may specify a complying entity and/or a participating entity associated with compliance. Therefore, the ACP payload analysis module 418 may identify a pending task and/or pending schedule, and in doing so, determine whether the identity of the entity associated with the D-GRC controller 402 corresponds to the designated complying entity or participating entity associated with the ACP.

The association of payload data to a currently pending/compliant task and/or schedule may be based on the analysis of payload data content. For example, natural language processing (NLP) and natural language understanding (NLU) algorithms may be employed to infer the context of the payload data relative to a currently pending/compliant task and/or schedule of the ACP.

Alternatively, or additionally, the ACP payload analysis module 418 may prompt the entity associated with the D-GRC controller 402, via the interface module 414, to identify the pending/compliant task and/or schedule to associate with the payload data.

Moreover, the ACP payload analysis module 418 may further analyze the payload data, via one or more trained machine-learning algorithms, to infer a likely impact of the payload data on the ACP. The likely impact may correspond to a demonstration of compliance of a pending task, non-compliance of the pending task, a revocation of compliance of a compliant task, or an incremental data entry associated with a pending task (i.e. monitored interaction between a complying entity and participating entity). The likely impact may also include a change to the permissions schedule associated with the ACP. A change to the permissions schedule may correspond to a change to existing permissions associated with the ACP or include permissions for a new task or a new schedule included within the ACP. In other examples, the likely impact may relate to a change to the task and schedule requirements of the ACP. For example, the payload data may include updated safety rules associated with the ACP. In this example, the ACP payload analysis module 418 may infer the inclusion of new tasks or schedules, or a change to existing tasks or schedules, based on the updated safety rules.

In various examples, the ACP payload analysis module 418 may correlate payload data with historical instances of payload data from the data store 422. In some examples, the ACP payload analysis module 418 may generate a data model based on historical instances of payload data, and further correlate current payload data with data points of the data model. In this way, the ACP payload analysis module 418 may infer a likely impact of payload data on the ACP, based on the correlation.

The one or more trained machine-learning algorithms may include, but are not limited to, supervised learning, unsupervised learning, semi-supervised learning, naive Bayes, Bayesian network decision trees, neural networks, fuzzy logical models, multiclass decision forest, and/or probabilistic classification.

The distributed ledger module 420 may further include a permission(s) component 424, an ACP component 426, and a data structure component 428. The permission(s) component 424 may be configured to generate and modify a granular set of permissions stored within the distributed ledger 202. The set of permissions is configured to control each interaction of one or more entities with the ACP. For example, a complying entity may be authorized to access, upload, or download data associated with a pending task on the ACP, but may be prevented from changing the pending task's list of requirements.

In one example, the permission(s) component 424 may act on permissions data received via the interface module 414. The permissions data may correspond to a change to a set of established permissions associated with the ACP, or a new set of permissions associated with the ACP. The new set of permissions may relate to a change in compliance requirements of an existing task or schedule within the ACP or a new task or new schedule incorporated with the ACP. In another example, the permission(s) component 424 may act on an inferred impact on the permissions schedule, as derived by the ACP payload analysis module 418.

The permission(s) component 424 may employ one or more trained machine-learning algorithms to analyze the permissions data and infer a likely impact of the permissions data on the current state of the permissions schedule stored within the distributed ledger. The permission(s) component 424 may further generate a new state of the permissions schedule that is to be incorporated within the distributed ledger, based on the analysis of the permission data.

The ACP component 426 may employ one or more trained machine-learning algorithms to generate and modify tasks and schedules associated with the ACP. In one example, the ACP component 426 may generate and modify the ACP based at least in part on an input received via the interface module 414, or an analysis inferred by the ACP payload analysis module 418. The changes to the ACP may correspond to a demonstration of compliance of a pending task, non-compliance of the pending task, or revocation of compliance of a compliant task. Additionally, or alternatively, the changes to the ACP may relate to updated safety rules associated with the ACP. The updated safety rules may spur the inclusion of new tasks and/or new schedules, or a change to existing tasks and/or existing schedules.

The data structure component 428 may encode changes to the permissions schedule and ACP into the distributed ledger. In other words, the data structure component 428 may generate an updated permissions schedule based on permissions data received from the permission(s) component 424 and an updated ACP received from the ACP component 426. The data structure component 428 may be further configured to encode the updated permissions schedule and the updated ACP into the distributed ledger 202, such that subsequent invocations of the permissions schedule and the ACP may invoke the updated permissions schedule and the updated ACP.

The distributed ledger 202 may be configured to store a copy of the blockchain that includes each instance of the permissions schedule and ACP, while being updated, across multiple complying and participating entities. The distributed ledger 202 may include a consensus algorithm that is configured to replace, share, and synchronize the blockchain across multiple geographically disparate D-GRC controllers. Unlike a centralized system, the consensus of the distributed ledger 202, via the consensus algorithm, requires no central administrator or centralized data storage. Instead, the distributed ledger 202 is spread across several nodes (i.e. D-GRC controllers) via a peer-to-peer network.

The data store 422 may include historical payload data used to generate a data model to analyze current payload data. In some examples, the historical payload data may comprise an aggregate of payload data associated with the ACP over a predetermined time interval. The historical payload data may be imported and aggregated from a plurality of entities that interact with the ACP. Alternatively, the historical payload data may correspond to interactions associated with the instant D-GRC controller 402.

FIGS. 5A through 5C illustrate exemplary embodiments of the ACP. FIG. 5A illustrates an exemplary compliance plan that includes a plurality of schedules. FIG. 5B illustrates an exemplary schedule of the compliance plan that includes a plurality of tasks. FIG. 5C illustrates an exemplary task that includes a plurality of actions.

Referring to FIG. 5A, the ACP 104 may be based on governmental and/or non-governmental rules and best practices that govern an agricultural operation. The ACP 104 may be developed to monitor each phase of agriculture from seed management through to shipment. In the illustrated example, the ACP 104 includes a plurality of schedules that each reflect a divisible phase of an agricultural operation. For example, the ACP 104 may include but is not limited to, a schedule for seed management, plant growth, plant harvest, and agricultural shipment.

Each schedule of the ACP 104 may further include a listing of interacting entities, dependencies, data integration, and compliance status. The listing of interacting entities includes different facilities that may interact with one another as part of showing compliance with each schedule. Each interacting entity is designated as a "complying entity," labeled as "(C)" in FIG. 5A, or a "participating entity," labeled as "(P)" in FIG. 5A. A complying entity may be an entity that is responsible for providing evidence of compliance, while a participating entity is an entity with whom a complying entity may interact to gather data for compliance. For example, in FIG. 5A, the "seed management" schedule includes a listing of at least three interacting entities, namely a supplier, warehouse, and auditor. The supplier and auditor are identified as complying entities, meaning that they are responsible for providing evidence for compliance with the seed management schedule. The "warehouse" is identified as a participating entity, meaning that the warehouse need only provide data, as requested, to one of the complying entities as part of showing compliance to the seed management schedule.

Moreover, the dependencies listed within the ACP indicate a sequential order in which schedules of the compliance plan are completed. In other words, the dependencies identify whether the execution of one schedule is dependent on the completion of another. Referring to FIG. 5A, the "plant harvest" schedule is dependent on the completion of the "plant growth" schedule, which in turn is dependent on the completion of the "seed management" schedule. Thus the "plant harvest" schedule may be executed following the completion of the seed management schedule and the plant growth schedule.

The data integration refers to the capturing of compliance data associated with the ACP. The data captured may include electronic copies of documents evidencing compliance, multimedia content evidencing compliance, compliance statements penned by authorized personnel, or any combination thereof. In some examples, the data captured may also include payload messages sent between interacting entities.

FIG. 5B illustrates a schedule 502 of the ACP 104. The schedule 502 may include a listing of divisible tasks that are to be completed in order for the schedule 502 to be compliant. Similar to the ACP 104, the schedule may be based on governmental and/or non-governmental safety rules and industry best practices that govern an agricultural operation. In the illustrated example, the "seed management" schedule may include a plurality of tasks, namely, a visual inventory inspection, capturing inventory code, monitoring water conditions, a food safety audit, and monitoring facility environmental conditions. Similar to the ACP 104 of FIG. 5A, the schedule 502 may include a listing of entities responsible for showing compliance with a task (i.e. complying entities and participating entities), dependencies, and compliance status.

FIG. 5C illustrates a task 506 of schedule 502. The task 506 may include a listing of divisible action items that are to be completed in order for the task 506 to be compliant. Similar to schedule 502 and the ACP 104, task 506 may be based on governmental and/or non-governmental safety controls and best practices that govern an agricultural operation. In the illustrated example, the "visual inventory inspection" task may include a plurality of actions, namely a visual inspection of seeds, trays, rafts, and automated inspection of media, fertilizer, and pesticides. Similar to the ACP 104 of FIG. 5A, the task 506 may include data integration and compliance status.

FIGS. 6 through 10 present processes 600 through 1000 that relate to operations of the D-GRC controller. Each of processes 600 through 1000 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600 through 1000 are described with reference to the computing environment 100 of FIG. 1.

Figure 6:
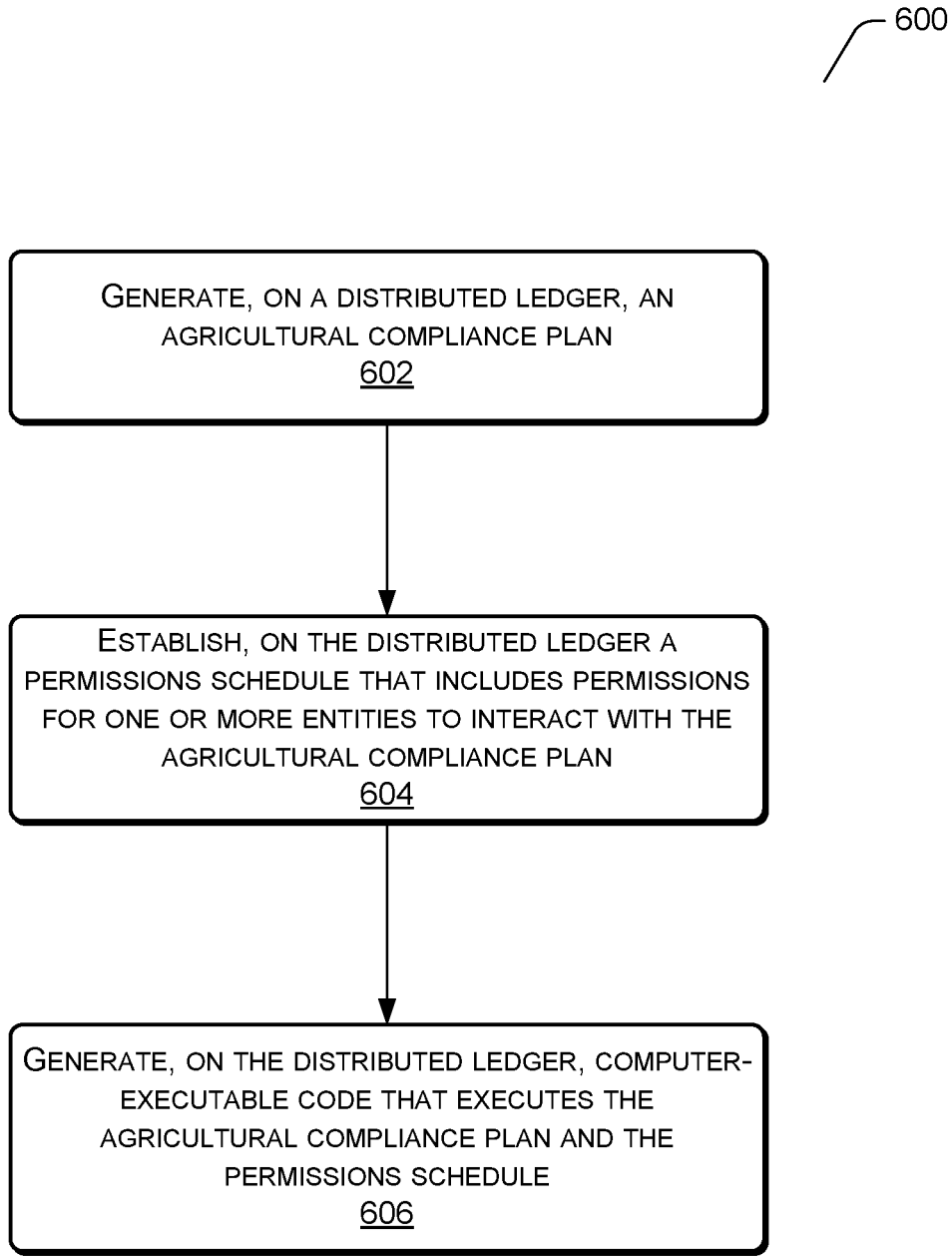
FIG. 6 illustrates a process for generating a distributed ledger that is configured to execute an agricultural compliance plan (ACP).

FIG. 6 illustrates a process for generating a distributed ledger that is configured to execute an agricultural compliance plan (ACP). The distributed ledger may reside on one or more D-GRC controller(s) associated with complying entities and participating entities. A complying entity may correspond to an entity that is responsible for providing evidence of compliance of a task, and a participating entity may be an entity with whom the complying entity interacts to gather data to show compliance.

At 602, the D-GRC controller may generate, on a distributed ledger, an ACP that monitors compliance of an agricultural operation with various government and/or non-government safety rules. The ACP may include a number of schedules that monitor the integrity and health of the agricultural operation during specific agricultural cycles. Further, each schedule may include a list of tasks that each require completion for the schedule to be deemed, compliant.

The distributed ledger may be a data structure that is used to store data records associated with the ACP. The distributed ledger may be accessible by multiple entities, such as the complying entity, the participating entity, and a third party (i.e. auditing) entity.

At 604, the D-GRC controller may establish, on the distributed ledger, a permissions schedule that includes an authorization list of one or more entities (i.e. complying entity, participating entity, or a combination thereof) that are approved to access, upload, download, and modify the ACP via the distributed ledger. The permissions schedule may include a granular set of permissions that control each entity's interaction with the ACP. For example, the permissions schedule may enable a complying entity to access data, upload data, download data, and update data associated with the ACP, or a related task or schedule. However, at the same time, the permissions schedule may prevent the complying entity from changing task requirements associated with a schedule. Similarly, the permissions contact may enable a participating entity to upload data to the ACP, or a related task or schedule. At the same time, the participating entity may be prevented from modifying a compliance status associated with the related task or schedule.

In some examples, the permissions schedule may include a discrete set of permissions for a third-party, such as an auditor. In this example, the permissions schedule may permit the auditor to access data and download data associated with the ACP.

Some entities may be designated as complying entities, participating entities, or both. The permissions schedule may include a differing granularity of permissions for each entity depending on the task or schedule. For example, some entities may retain permissions of a complying entity for one task or schedule but retain permissions of a participating entity for a different task or schedule. In other examples, entities may retain a set of permission for the ACP, generally.

At 606, the D-GRC controller may generate, on the distributed ledger, computer-executable code that enables a showing of compliance with the ACP, or a related task or schedule. The computer-executable code may be configured to execute the permissions schedule, receive data entries associated with the ACP, encode the data entries onto the distributed ledger, and automatically publish the distributed ledger to other nodes (i.e. an entity controller associated with a complying entity, participating entity, auditing entity, and/or so forth).

Figure 7:
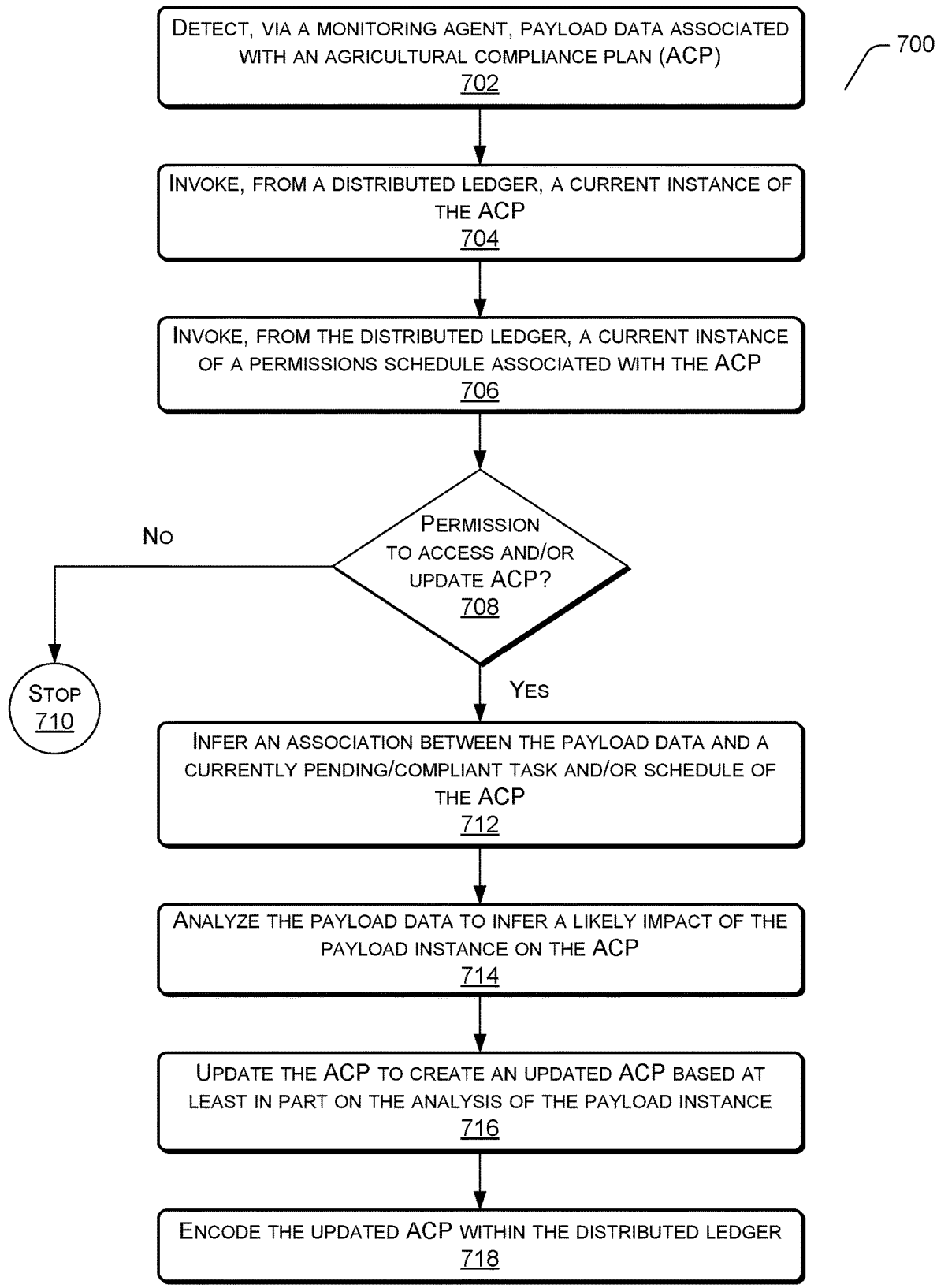
FIG. 7 illustrates a process for updating progress through an Agricultural Compliance Plan (ACP) on the distributed ledger.

FIG. 7 illustrates a process for updating progress through an Agricultural Compliance Plan (ACP) on the distributed ledger. In one example, an ACP may be updated to show compliance or non-compliance with a pending task. The update may also relate to revocation of compliance of a compliant task. In another example, the update may record an interaction between a complying entity and a participating entity.

At 702, a D-GRC controller may detect, via a monitoring agent, payload data associated with an ACP. The monitoring agent may detect receipt of payload data from another D-GRC controller. Alternatively, the detected payload data may correspond to an interaction (i.e. create, read, update, or delete) with the ACP at the instant D-GRC controller 402 within which the monitoring agent resides. The interaction may correspond to a data entry that supports compliance or non-compliance with the pending task and/or a statement of compliance or non-compliance with the pending task. Alternatively, the interaction may correspond to the revocation of compliance of a compliant task and/or schedule.

In some examples, the D-GRC controller may include a dashboard interface that is configured to facilitate receipt of payload data from an entity associated with the D-GRC controller, or another D-GRC controller.

The payload data may include an upload of data (i.e. multimedia) associated with compliance of a pending task, a statement of compliance and/or non-compliance, a record of an interaction (i.e. capture by a monitoring agent)

between the entity and another entity, such as a participating entity, or any combination thereof.

At 704, the D-GRC controller may invoke a current instance of the ACP from a distributed ledger. In this example, the D-GRC controller may be configured to execute computer-executable instructions that retrieve a current instance of the ACP from a repository of the distributed ledger. In this example, the current instance of the ACP may identify a next pending task awaiting compliance.

At 706, the D-GRC controller may invoke a current instance of a permissions schedule associated with the ACP from the distributed ledger. In doing so, the ACP may determine whether the entity that invoked the ACP is authorized to access and/or update the ACP. In some examples, the permissions schedule may include a granular set of permissions that provide different levels of authorization for different tasks and/or schedules associated with the ACP. For example, a complying entity may be authorized to provide evidence of compliance for a first pending task, such as a visual inspection of a grower's operation. However, the same complying entity may not be authorized to upload data associated with a second pending task, such as monitoring water conditions of the grower's operation.

At 708, the D-GRC controller may determine whether the entity associated with the D-GRC controller is authorized to access and/or update the ACP based on a comparison of the entity's authorization credentials and the permissions schedule. The authorization credentials may correspond to an entity identifier or a username and password combination.

At 710, the D-GRC controller may determine that the entity is not authorized to access and/or update the ACP. In doing so, the D-GRC controller may terminate the access and/or update request associated with the ACP.

At 712, the D-GRC controller may determine that the entity is authorized to access and/or update the ACP. In doing so, the D-GRC controller may analyze the payload data, via one or more trained machine-learning algorithms, to infer an association between the payload data and a currently pending/compliant task and/or schedule of the ACP. The association may be inferred based on an identity of the entity associated with the D-GRC controller relative to designated complying or participating entities associated with the ACP. Alternatively, or additionally, the association may be inferred based on an analysis of the content of the payload data.

Additionally, the D-GRC controller may include a monitoring agent that is configured to detect and record interactions. Each interaction may be recorded within a data structure of the distributed ledger for the purpose of maintaining a chain of custody of data and data-related interactions associated with the ACP. The D-GRC controller may be configured to automatically associate the interaction with a currently pending task of the ACP. Alternatively, the entity associated with the D-GRC controller that initiated the interaction may be prompted to associate the interaction with a pending and/or compliant task.

At 714, the D-GRC controller may use one or more trained machine learning algorithms to analyze the payload data to infer a likely impact on the ACP. The likely impact may correspond to a demonstration of compliance of a pending task, non-compliance of the pending task, a revocation of compliance of a compliant task, or an incremental data entry associated with a pending task (i.e. monitored interaction between a complying entity and participating entity).

In some examples, the D-GRC controller may further identify one or more physical agricultural specimens that are associated with the payload data and automate, via one or more machine-learning algorithms, an analysis the further determines an atmospheric compositions associated with the one or more physical agricultural specimens. This additional step may assist in determining whether the physical agricultural specimens are healthy or unhealthy. In the event that the physical agricultural specimens are unhealthy, a further automated analysis may determine a disease classification, based at least in part on the payload data, and the atmospheric composition. The disease classification may be based on a comparison of payload data, atmospheric composition data, and other pertinent data (i.e. agricultural specimen image data, physical characteristic data, and/or so forth) when compared to reference data that pertains to various disease classifications.

At 716, the D-GRC controller may update the ACP to create an updated ACP from an initial state to a new state, based at least in part on the analysis of the payload instance. For example, consider an initial state of the ACP that identifies a pending task to visually inspect a grower's operation. The D-GRC controller may receive an upload of data associated with the visual inspection (i.e. multimedia content that memorializes the inspection), and in response to an analysis of the uploaded data, update the ACP accordingly.

At 718, the D-GRC controller may encode the updated ACP into the distributed ledger by generating a data structure, such as a block within a blockchain. The data structure (i.e. block) acts to replace the initial ACP with the updated ACP. Therefore, a subsequent invocation of the ACP by any entity via the distributed ledger acts to invoke the updated ACP, rather than the initial ACP.

It is noteworthy that the new state of the ACP updates the initial state of the ACP with the data entry of the payload instance. In this way, the new state may designate the pending task of the initial state as a compliant task and may further identify the next pending task of the ACP. The new state may further include an update to the pointer address of the ACP such that a subsequent invocation of the ACP, by the same or another entity (i.e. complying entity, participating entity, and/or auditing entity) accesses the new state of the ACP, rather than the initial state.

Figure 8:
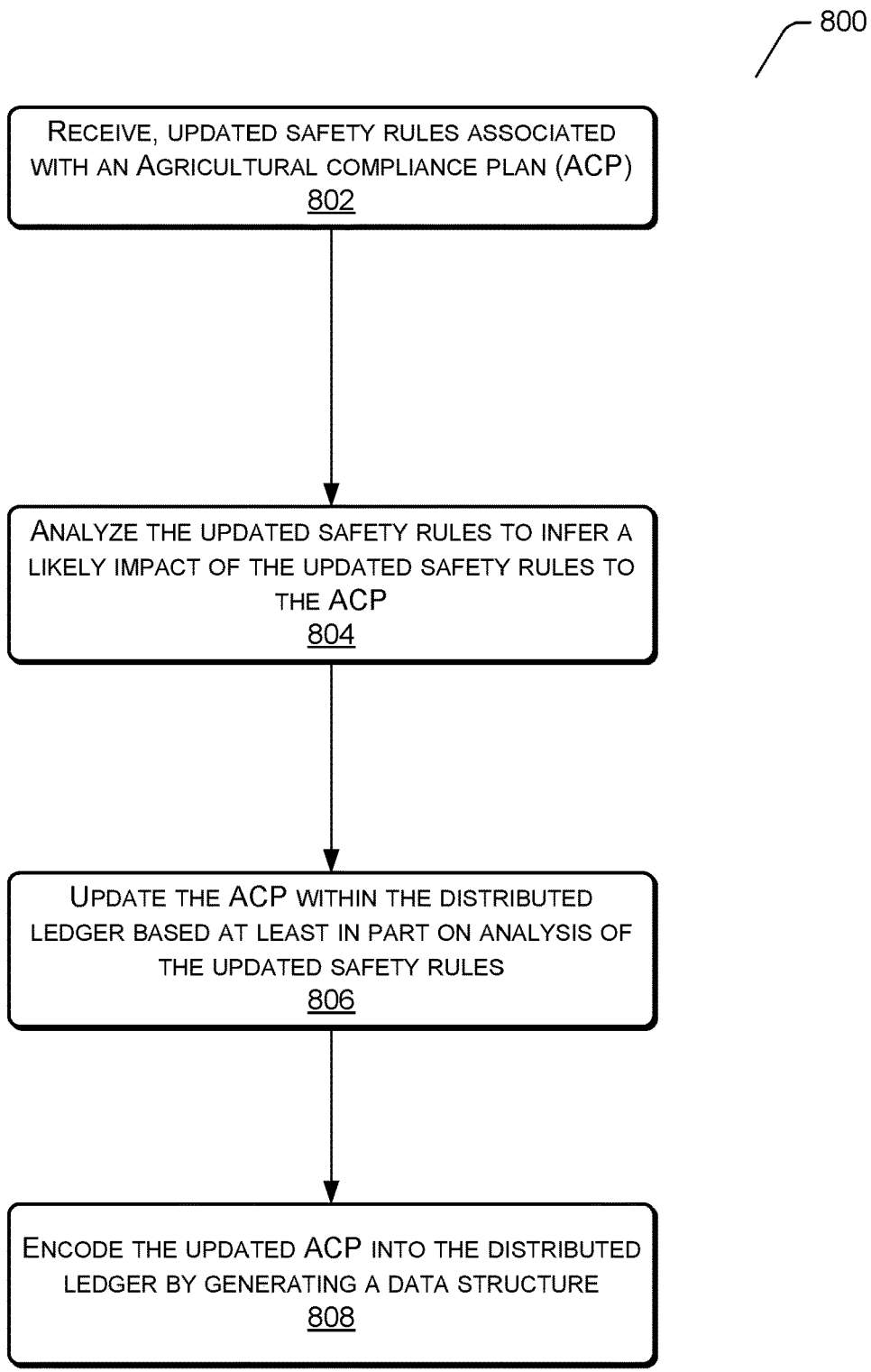
FIG. 8 illustrates a process for modifying the permissions schedule or the procedures of the Agricultural Compliance Plan (ACP).

FIG. 8 illustrates a process for modifying the permissions schedule or the procedures of the Agricultural Compliance Plan (ACP). In various examples, the government or non-government safety rules that form the foundation of the ACP may change based on new advances in agricultural technology. Industry best practices may also influence the procedures used to govern and ensure the health and safety of an agricultural operation. As a result, the ACP and the corresponding permissions schedule are configured to accommodate and dynamically adopt such changes within the distributed ledger.

At 802, the D-GRC controller may receive updated safety rules associated with an ACP. The updated safety rules may impact pending tasks and compliant tasks of the ACP. The D-GRC controller may receive the updated safety rules as a user input from a government body, an operator of the grower's operation, or a non-government industry body responsible for setting best practices for agricultural operations.

In one example, the updated safety rules may impose more rigorous requirements for task and/or schedule compliance. For example, an initial task to visually inspect a grower's operation may be replaced with an updated task to perform detailed magnified inspections. Alternatively, the updated safety rules may ease the requirements for task and/or schedule compliance (i.e. a change from a detailed inspection requirement to a visual inspection requirement).

At 804, the D-GRC controller may use one or more machine learning algorithms to infer a likely impact of the updated safety rules on the ACP. In one example, an impact analysis may be performed by an operator of the D-GRC controller. Alternatively, the D-GRC controller may analyze historical instances of the ACP to determine a likely impact of the updated safety rules on the ACP.

By way of example, the updated safety rules may change the status of previously compliant tasks to pending tasks in the event that the updated safety rules include more demanding requirements than the preceding safety rules.

The D-GRC controller may also modify the status of tasks and/or schedules that are dependent on the compliance of a previously compliant task that has been updated to be a pending task. For example, consider a schedule whereby the performance and compliance of tasks 'B' and 'C' may depend on the performance and compliance of task 'A'. In the event that the status of task 'A' changes from 'compliant' to 'pending,' the compliance status of tasks 'B' and 'C' may also change to or remain 'pending' based on their dependency to task 'A'.

At 806, the D-GRC controller may update the ACP within the distributed ledger from an initial state to a new state, based at least in part on the analysis of the updated safety rules. By way of example, the D-GRC controller may store a copy of the updated ACP within a repository associated with the ACP and further update a pointer address of the ACP such that a subsequent invocation of the ACP, by any entity (i.e. complying entity, participating entity, and/or auditing entity) may access the updated ACP.

It is noteworthy that the D-GRC controller may access and update the ACP on the basis of having the requisite permissions within the permissions schedule of the distributed ledger. The determination of the requisite permissions is described in further detail with reference to FIG.

At 808, the D-GRC controller may encode the updated ACP into the distributed ledger by generating a data structure, such as a block within a blockchain. The data structure (i.e. block) may act to replace the initial ACP with the updated ACP. Therefore, a subsequent invocation of the ACP by any entity via the distributed ledger acts to invoke the updated ACP, rather than the initial ACP.

In various examples, the D-GRC controller may update the permissions schedule in a similar manner to process 600. For example, the D-GRC controller may receive a revision to the permissions schedule that provides for or rescinds permissions of an entity to interact with the ACP. The D-GRC controller may generate, via permissions-code of the permissions schedule, an updated permissions schedule based on the revision. The D-GRC controller, via the permissions-code, may store a copy of the updated permissions schedule within a repository associated with the permissions schedule and further update a pointer address of the permissions schedule such that a subsequent invocation of the permissions schedule, by any entity (i.e. complying entity, participating entity, and/or auditing entity), may access the updated permissions schedule.

Further, the D-GRC controller, via a DL module, may encode the updated permissions schedule into the distributed ledger by generating a data structure, such as a block within a blockchain. The data structure (i.e. block) may act to replace the initial permissions schedule with the updated permissions schedule. Therefore, a subsequent invocation of the permissions schedule by any entity via the distributed ledger acts to invoke the updated permissions schedule, rather than the initial permissions schedule.

Figure 9:
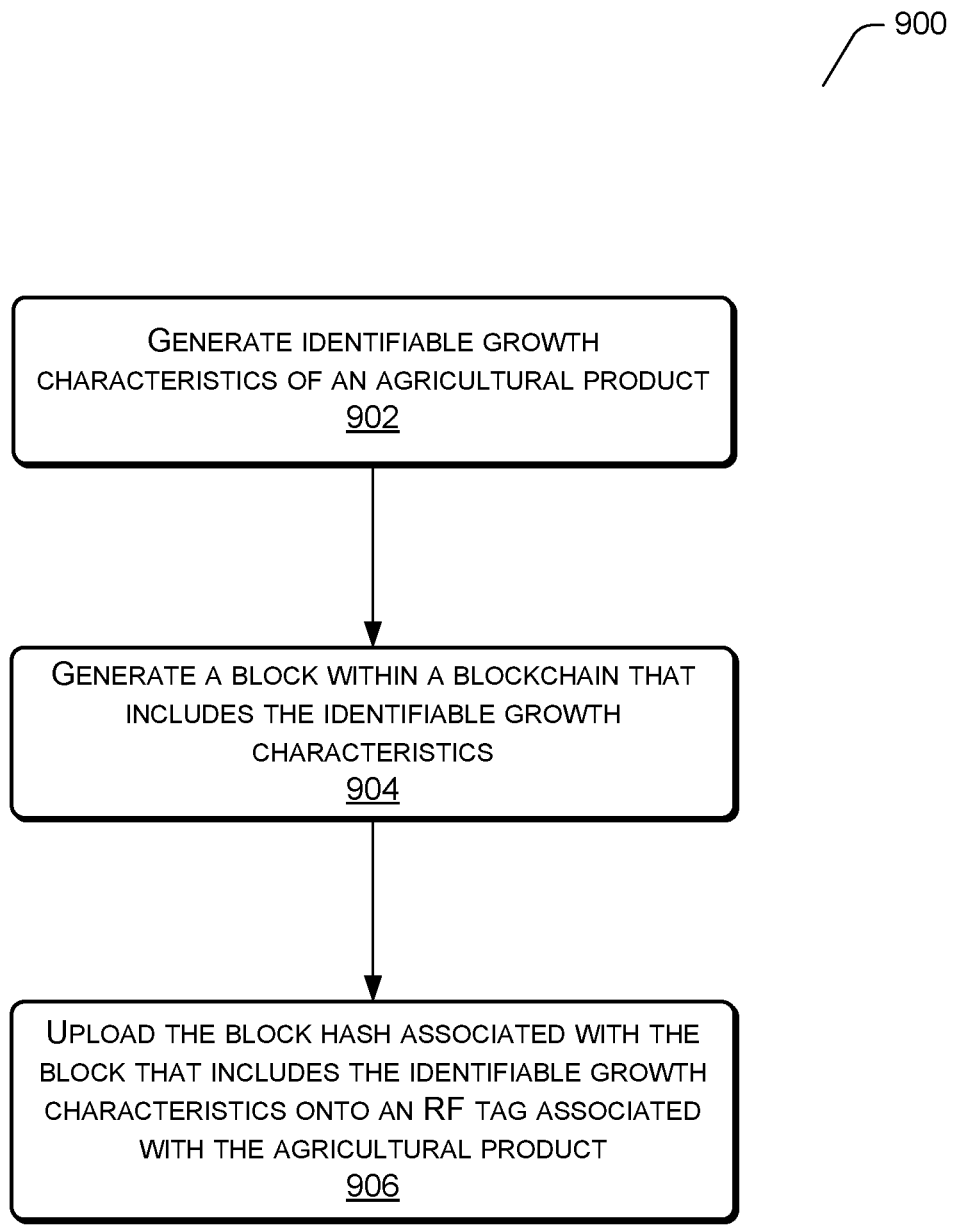
FIG. 9 illustrates a process for uploading a block hash onto an RF tag associated with a plant-based product.

FIG. 9 illustrates a process for uploading a block hash onto an RF tag associated with an agricultural product. The block hash may be stored within a Radio Frequency tag, a Quick Response (QR) code, or any other machine-readable code that is physically associated with an agricultural product.

At 902, a sending entity may generate identifiable growth characteristics of an agricultural product. The identifiable growth characteristics may include plant identifiers (i.e. crop identifiers, greenhouse identifiers, batch identifiers), plant characteristics (i.e. plant weight), and/or any other uniquely identifiable growth parameter.

At 904, the sending entity may generate a block within a blockchain that includes the identifiable growth characteristics. More specifically, the block may be configured to incorporate a Merkle Root hash of its immediately preceding block within the blockchain, and a block hash of the content of the block itself, which includes the Merkle Root hash and the identifiable growth characteristics. Thus, the block hash becomes a unique identifier relative to other blocks within the blockchain.

At 906, the sending entity may upload the block hash associated with the block that includes the identifiable growth characteristics onto an RF tag associated with the agricultural product. In doing so, a receiving entity may compare the block hash from the RF tag to block hashes of the blockchain associated with the ACP. A match of block hashes implicitly verifies an association between the agricultural product and the blockchain of the ACP. Further, the receiving entity may access the matching block of the blockchain to verify the identifiable growth characteristics associated with the agricultural product, provided the receiving entity retains the requisite access privileges to access the block of the blockchain.

Figure 10:
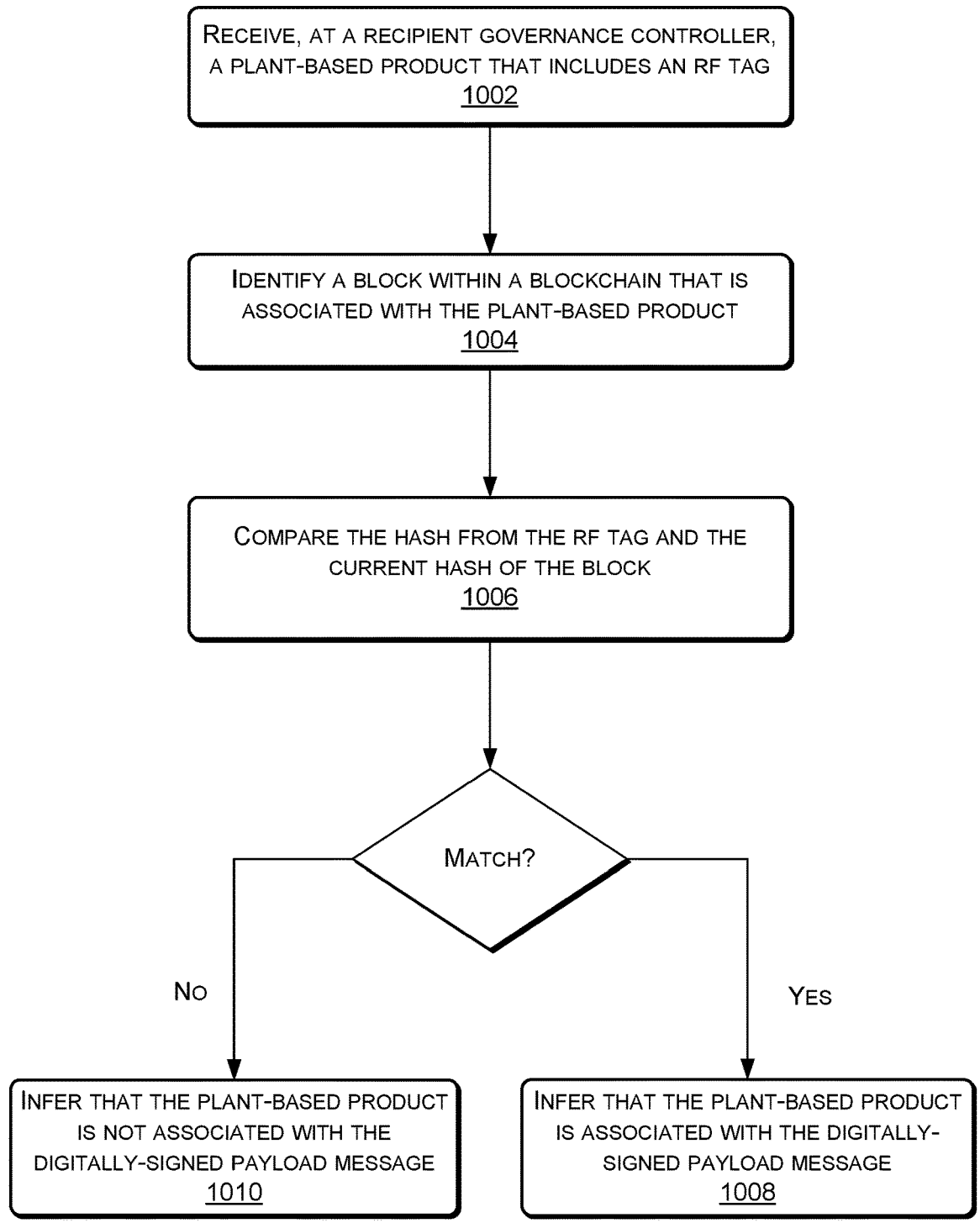
FIG. 10 illustrates a process for verifying the authenticity of an agricultural product via a block hash stored within a Radio Frequency (RF) tag.

FIG. 10 illustrates a process for verifying the authenticity of an agricultural product via a block hash stored within a Radio Frequency (RF) tag. In some examples, an agricultural product may be shipped between facilities as part of an ongoing process of developing a harvested crop for retail sale. Process 1000 provides a mechanism for verifying whether an agricultural product delivered to a recipient facility is received in the same condition that it left the sending facility. In other words, process 1000 acts to verify than the agricultural product received at a recipient facility has not been tampered with or replaced during shipment from a sending facility.

At 1002, a recipient facility may receive an agricultural product that includes an RF tag. The RF tag may store a block hash that corresponds to a block of a blockchain associated with the ACP. In an alternative embodiment, a QR code may be used to store the block hash rather than the RF tag.

At 1004, the recipient facility, via a recipient D-GRC controller, may retrieve the block hash from the RF tag. In one embodiment, an RF tag reader may be used to retrieve the block hash. In another embodiment, a QR code reader may be used to retrieve the block hash from a QR code that is adopted in lieu of an RF tag.

At 1006, the recipient D-GRC controller may compare the block hash from the RF tag with block hashes of blocks within the blockchain associated with the ACP. The block hash of each block within the blockchain corresponds to a cryptographic hash of the content of the block, which includes the Merkle Root hash of the immediately preceding block. In this way, two blocks within a blockchain cannot have the same block hash. Accordingly, the block hash acts as a block identifier that can be used to uniquely identify the block within the blockchain that contains the identifiable growth characteristics.

At 1008, the recipient D-GRC controller may determine that the block hash stored within the RF tag does not match one of the block hashes of the blockchain associated with the ACP. In doing so, the recipient D-GRC controller may explicitly infer that the agricultural product is not associated with the blockchain, and further implicitly infer that the agricultural product has been physically tampered with during shipment or did not originate from the sending facility.

At 1010, the recipient D-GRC controller may determine that the block hash stored within the RF tag does match one of the block hashes of the blockchain associated with the ACP. In this example, the match verifies that the agricultural product is associated with the ACP (i.e. blockchain). Accordingly, the receiving entity may discern the identifiable growth characteristics of the agricultural product from the content of the matching block, provided the recipient D-GRC controller retains the requisite access privileges to access the block of the blockchain.

Upon reviewing the identifiable growth characteristics stored with the block, the recipient facility may determine whether the agricultural product has been tampered with during shipment (i.e. change in weight and so forth).

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
    under control of one or more processors:
        detecting, at a decentralized governance compliance (D-GRC) controller, a communication of payload data that includes data associated with compliance of a pending task associated with an agricultural compliance plan (ACP), a statement of compliance or non-compliance associated with the pending task, or a plurality of messages sent between a complying entity that is authorized to provide evidence of compliance to the pending task and a participating entity that is authorized to provide the complying entity with evidence of compliance to the pending task;
        invoking, from a distributed ledger, a current instance of the ACP;
        analyzing the payload data to infer an impact of the payload data on the ACP; and
        dynamically updating the ACP to create an updated ACP, based at least in part on analysis of the payload data; and
        encoding the updated ACP within the distributed ledger.

2. The computer-implemented method of claim 1, wherein the D-GRC controller is a first D-GRC controller, and wherein detecting the payload data further comprises:
    receiving the payload data from a second D-GRC controller; and
    associating the payload data with a particular task of the ACP, based at least in part on a first identity of the first D-GRC controller or a second identity of the second D-GRC controller, the task corresponding to the pending task or a compliant task, and
    wherein, analyzing the payload data to infer a likely impact on the ACP is automated via one or more machine-learning algorithms and is further based at least in part on the particular task.

3. The computer-implemented method of claim 1, further comprising:
    identifying one or more physical agricultural specimens that are associated with the payload data;
    automating an analysis of content of the payload data, via one or more machine-learning algorithms, to identify a particular task of the ACP that is associated with the payload data, the automated analysis to further determine an atmospheric composition associated with the one or more physical agricultural specimens;
    automating, via the one or more machine-learning algorithms, a disease classification that is associated with the one or more physical agricultural specimens, based at least in part on the payload data and the atmospheric composition associated with the one or more physical agricultural specimens, and
    wherein, analyzing the payload data to infer a likely impact on the ACP is further based in part on at least one of the content of the payload data, the atmospheric composition, or the disease classification.

4. The computer-implemented method of claim 1, further comprising:
    determining an identity of an entity associated with the D-GRC controller;
    retrieving, from the distributed ledger, a current instance of a permissions schedule of the ACP, the permissions schedule that controls entity read-write access to the ACP; and
    determining an authorization of the entity to update the ACP, based at least in part on the permissions schedule, and
    wherein, dynamically updating the ACP to create the updated ACP is further based at least in part on verifying that the entity is permitted to update the ACP.

5. The computer-implemented method of claim 1, wherein the distributed ledger corresponds to a blockchain associated with the ACP, and further comprising:
    storing the updated ACP within an ACP repository associated with the blockchain;
    generating new state data associated with the updated ACP, the new state data including a pointer address to the updated ACP within the ACP repository; and
    generating a new block for the blockchain that includes a new block content and a first hash of the new block content, the new block content including the payload data, the new state data, and a second hash of an immediately preceding block, and
    wherein, encoding the updated ACP within the distributed ledger further includes executing computer-executable instructions that connect the new block to the blockchain.

6. The computer-implemented method of claim 1, wherein the distributed ledger corresponds to a blockchain associated with the ACP, and wherein the payload data includes an update to a permissions schedule associated with the ACP, and further comprising:
    generating an updated permissions schedule based at least in part on analysis of the payload data;

storing the updated permissions schedule within a permissions schedule repository associated with the blockchain;

generating new state data associated with the updated permissions schedule, the new state data including a pointer address to the updated permissions schedule within the permissions schedule repository;

generating a new block for the blockchain that includes a new block content and a first hash of the new block content, the new block content including the payload data, the new state data, and a second hash of an immediately preceding block; and encoding the updated permissions schedule within the distributed ledger by executing computer-executable instructions that connect the new block to the blockchain.

7. The computer-implemented method of claim 1, wherein encoding the updated ACP within the distributed ledger further comprises:

executing a consensus algorithm within the distributed ledger that causes the distributed ledger to replicate and synchronize with other instances of the distributed ledger stored on other D-GRC controllers associated with the ACP.

8. The computer-implemented method of claim 1, wherein the payload data includes data that corresponds to an update to safety rules associated with the ACP, and wherein analysis of the payload data corresponds to an inclusion of new tasks, new schedules, or a change to existing tasks or existing schedules, based at least in part on the update to the safety rules.

9. The computer-implemented method of claim 1, wherein the distributed ledger corresponds to a blockchain associated with the ACP, and further comprising:

receiving, at an entity associated with the D-GRC controller, a physical specimen that includes one of a Radio Frequency (RF) tag or a Quick Response (QR) code tag;

retrieving, from the RF tag or the QR tag, a retrieved block hash associated with the blockchain;

comparing the retrieved block hash with instances of block hashes within the blockchain;

identifying a match between the retrieved block hash and a matching block of the blockchain, the matching block being one of the instances of block hashes within the blockchain; and accessing, via the distributed ledger, content of the matching block to verify an authenticity of the physical specimen.

10. The computer-implemented method of claim 1, wherein the distributed ledger corresponds to a blockchain associated with the ACP, and further comprising:

determining that one or more physical agricultural specimens are to be delivered to a participating entity associated with the ACP;

capturing a block hash of a block within the blockchain that includes physical characteristics of the one or more physical agricultural specimens, the physical characteristics including at least one of plant identifiers, plant measurements, or plant colors; and prior to delivery of the one or more physical agricultural specimens, storing the block hash onto an RF tag or a QR code that is physically attached to the one or more physical agricultural specimens.

11. A decentralized governance compliance regulatory (D-GRC) controller, comprising:

one or more processors;

memory coupled to the one or more processors, the memory including one or more modules that are executable by the one or more processors to:

invoke, from a distributed ledger, a current instance of an agricultural compliance plan (ACP), the distributed ledger corresponding to a blockchain that includes one or more blocks that evidence progress of the ACP;

detect, via a monitoring agent, a communication of payload data that corresponds to compliance data showing compliance of a pending task associated with the ACP and corresponding to a visual inspection record of at least one of a greenhouse, a supplier, a warehouse, or a shipping vehicle;

analyze, via one or more trained machine-learning algorithms, the payload data to infer an impact on the ACP;

generate an update to the ACP to create an updated ACP based at least in part on analysis of the payload data;

generate a new block to be added to a most-recent block of the one or more blocks of the blockchain, the new block to include a new block content and a first hash of the new block content, the new block content to include at least the payload data, the updated ACP, and a second hash of the most-recent block;

execute computer-executable instructions that connects the new block to the most recent block of the blockchain; and execute a consensus algorithm to cause the distributed ledger to replicate and synchronize with other instances of the distributed ledger stored on one or more D-GRC controllers associated with the ACP.

12. The D-GRC controller of claim 11, wherein the one or more modules are further executable by the one or more processor to:

store the updated ACP within an ACP repository associated with the blockchain; and generate new state data that includes a pointer address to the updated ACP within the ACP repository, and wherein the new block content of the new block further includes the new state data.

13. The D-GRC controller of claim 11, wherein the one or more modules are further executable by the one or more processors to:

retrieve, from an RF tag associated with a physical agricultural specimen, a block hash associated with a block of the blockchain;

compare the block hash with the one or more blocks of the blockchain to identify a matching block;

access the matching block, based at least in part on a permissions schedule associated with the ACP; and determine an authenticity of the physical agricultural specimen, based at least in part on corresponding payload data from the matching block, the corresponding payload data to include at least one of a plant identifier, a plant weight, or a plant color associated with the physical agricultural specimen.

14. The D-GRC controller of claim 11, wherein the one or modules are further executable by the one or more processors to:

analyze to infer whether the payload data impacts a permissions schedule associated with the ACP;

in response to determining that the payload data impacts the permissions schedule, generate an update to the permissions schedule to create an updated permissions schedule, based at least in part on analysis of the payload data;

store the updated permissions schedule within a permissions schedule repository associated with the blockchain; and generate a new state data associated with the new block, the new state data to include a pointer address to the updated permissions schedule within the permissions schedule repository, and wherein, the new block content further includes the new state data.

15. One or more non-transitory computer-readable media storing computer-executable instructions that, when executed on one or more processors, cause the one or more processors to perform acts comprising:

generating agricultural compliance plan (ACP) data that includes an ACP repository and ACP computer-executable instructions to execute an ACP stored within the ACP repository;

storing, the ACP within the ACP repository, the ACP being configured to track an agricultural operation through a plurality of agricultural cycles;

generating permissions schedule data that includes a permissions schedule repository and permissions computer-executable instructions to execute a permissions schedule associated with the ACP stored within the permissions schedule repository;

storing the permissions schedule within the permissions schedule repository, the permissions schedule to identify at least a set of complying entities authorized to provide evidence of compliance for pending tasks of the ACP;

generating an initial state data that includes a first pointer address to the ACP within the ACP repository and a second pointer address to the permissions schedule within the permissions schedule repository;

generating an initial block of a blockchain that includes initial block content and a hash of the initial block content, the initial block content including the ACP data, the permissions schedule data, and the initial state data; and executing a consensus algorithm to cause the blockchain to replicate and synchronize with other instances of the blockchain stored on one or more D-GRC controllers associated with the ACP.

16. The one or more non-transitory computer-readable media of claim 15, further storing instructions that, when executed cause the one or more processors to perform acts comprising:

detecting, via a monitoring agent, a communication of payload data associated with the ACP;

analyzing, via one or more trained machine-learning algorithms, the payload data to infer an impact on the ACP;

generating an update to the ACP to create an updated ACP, based at least in part on analysis of the payload data;

storing the updated ACP within the ACP repository;

generating a next state data that includes at least a next pointer address to the updated ACP within the ACP repository and the second pointer address to the permissions schedule within the permissions schedule repository;

generating a next block to be connected to the initial block, the next block to include a next block content and a next block hash of the next block content, the next block content to include at least the payload data, the ACP data, the permissions schedule data, and the next state data;

executing computer-executable instructions that connect the next block to the initial block of the blockchain to create an updated blockchain; and executing the consensus algorithm to cause the updated blockchain to replicate and synchronize with other instances of the blockchain stored on one or more D-GRC controllers associated with the ACP.

17. The one or more non-transitory computer-readable media of claim 16, further storing instructions that, when executed cause the one or more processors to perform acts comprising:

determining that the payload data associated with the next block includes physical characteristics of one or more agricultural specimens to be delivered to a particular entity; and prior to delivery of the one or more agricultural specimens, storing the next block hash within an RF tag that is physically attached to the one or more agricultural specimens.

18. The one or more non-transitory computer-readable media of claim 16, wherein the payload data corresponds to a record of environmental conditions captured by sensors at a facility associated with an agricultural operation, the record of environmental conditions including at least one of temperature, moisture, or ambient light intensity.

* * * * *